US012692402B2

(12) United States Patent (10) Patent No.: US 12,692,402 B2

Kitada et al. (45) Date of Patent: Jul. 28, 2026

(54) INK JET INK SET AND RECORDING METHOD

(71) Applicant: Seiko Epson Corporation, Tokyo (JP)

(72) Inventors: Kenji Kitada, Shiojiri (JP); Takeshi Yano, Shiojiri (JP); Shinichi Naito, Chino (JP); Kenta Kikuchi, Suwa (JP); Hirofumi Hokari, Chino (JP)

(73) Assignee: SEIKO EPSON CORPORATION (JP)

( * ) Notice: Subject to any disclaimer, the term of this patent is extended or adjusted under 35 U.S.C. 154(b) by 1096 days.

(21) Appl. No.: 17/488,439

(22) Filed: Sep. 29, 2021

(65) Prior Publication Data

US 2022/0098424 A1 Mar. 31, 2022

(30) Foreign Application Priority Data

Sep. 30, 2020 (JP) ................................ 2020-165274

(51) Int. Cl.
*C09D 11/322* (2014.01)
*D06P 5/00* (2006.01)

(52) U.S. Cl.
CPC .............. *C09D 11/322* (2013.01); *D06P 5/00* (2013.01)

(58) Field of Classification Search
None
See application file for complete search history.

(56) References Cited

U.S. PATENT DOCUMENTS

| | | | | |
|---|---|---|---|---|
| 5,954,866 A | * | 9/1999 | Ohta ..................... | C09D 11/322 |
| | | | | 106/31.89 |
| 6,716,493 B1 | * | 4/2004 | Notsu .................. | B41M 7/0027 |
| | | | | 428/32.37 |
| 2002/0077385 A1 | | 6/2002 | Miyabayashi | |
| 2002/0127376 A1 | * | 9/2002 | Hutter .................. | B41M 5/5254 |
| | | | | 428/32.1 |
| 2004/0246321 A1 | * | 12/2004 | Takashima ............. | C09D 11/40 |
| | | | | 347/100 |
| 2005/0053734 A1 | * | 3/2005 | Hutter ................... | C08F 220/12 |
| | | | | 428/32.29 |

FOREIGN PATENT DOCUMENTS

| | | | | | |
|---|---|---|---|---|---|
| EP | 3540018 A1 | * | 9/2019 | ........... | B41J 2/2114 |
| JP | 2004-285348 A | | 10/2004 | | |
| JP | 2013-221141 A | | 10/2013 | | |
| JP | 2014001378 A | * | 1/2014 | | |
| JP | 2018-003184 A | | 1/2018 | | |
| JP | 2020-002266 A | | 1/2020 | | |

* cited by examiner

*Primary Examiner* — Jonathan Johnson

(74) *Attorney, Agent, or Firm* — Harness, Dickey & Pierce, P.L.C.

(57) ABSTRACT

One aspect of the ink jet ink set according to the present disclosure is an ink jet ink set including an anionic ink containing an anionic resin, a pigment, and water, and a cationic ink containing a cationic resin, a pigment, and water, in which the anionic ink and the cationic ink are similar colors to each other, the pigment in the anionic ink is coated with the anionic resin, the pigment in the cationic ink is coated with the cationic resin, and the anionic resin or the cationic resin, or both have a urethane-based skeleton or a polyester-based skeleton.

5 Claims, 1 Drawing Sheet

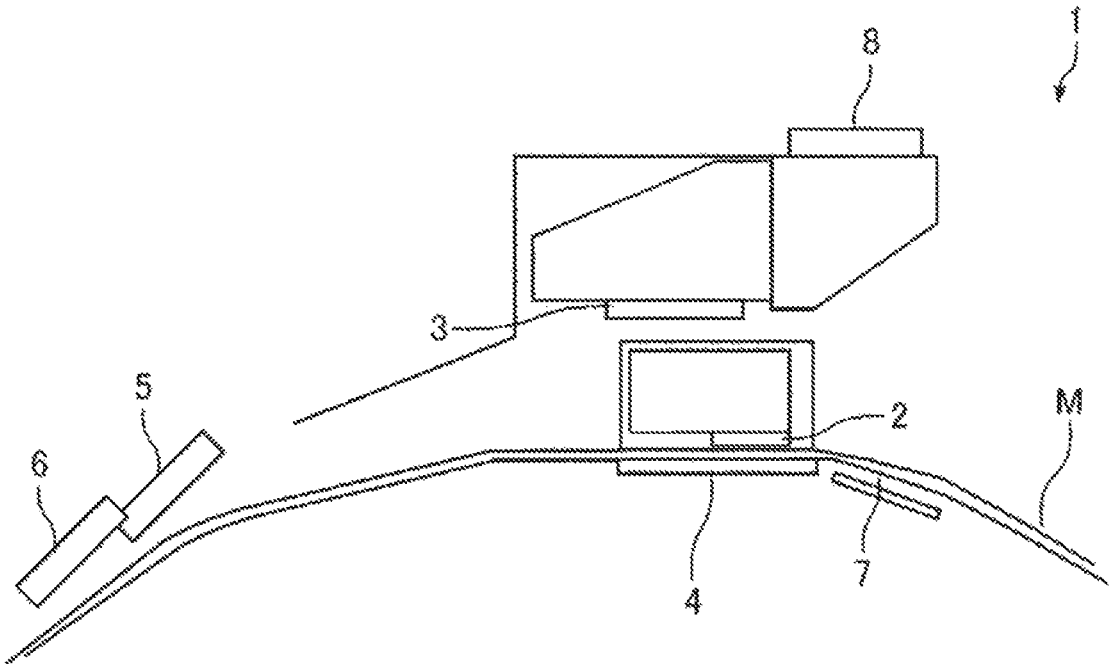

INK JET INK SET AND RECORDING METHOD

The present application is based on, and claims priority from JP Application Serial Number 2020-165274, filed Sep. 30, 2020, the disclosure of which is hereby incorporated by reference herein in its entirety.

BACKGROUND

1. Technical Field

The present disclosure relates to an ink jet ink set and a recording method.

2. Related Art

The ink jet recording method for recording images on a recording medium by ejecting minute ink droplets from a nozzle of an ink jet head of an ink jet recording apparatus is known and there is plenty of research not only on ink jet recording apparatuses but also on the ink compositions to be used. In recent years, dyeing (textile printing) of fabrics has also been performed using the ink jet recording method. In the related art, as textile printing methods for fabrics (woven fabrics and non-woven fabrics), screen printing methods, roller printing methods, and the like are used, but, since applying the ink jet recording method is advantageous from the point of view of diversified, small-quantity production, immediate printability, and the like, various studies are being carried out thereon.

In a method for textile printing using such an ink jet recording method, a treatment (pre-treatment) is performed on the recording medium with a cationic compound or the like in order to obtain good colorability of the printed material. By performing a pre-treatment on the recording medium, when an ink composition including anionic dispersed pigments or the like is attached to the recording medium, it is possible to aggregate the ink composition. Doing so makes it easier for the ink composition to remain in the vicinity of the surface of the recording medium, thus, it is possible to obtain good colorability.

For example, JP-A-2018-003184 describes an ink jet textile printing method in which an ink composition for textile printing with a pigment is attached to and used for printing on a fabric treated with a pre-treatment solution containing a cationic organic compound.

However, in the ink jet textile printing method described in JP-A-2018-003184, it is essential for the recording medium to be pre-treated in order to obtain good colorability of the printed material, and the fact that a pre-treatment step is necessary to improve colorability makes the ink jet textile printing method complicated. Thus, there is a demand for the aggregation of the ink composition to not depend on the surface charge state of the recording medium and to be able to obtain good colorability and excellent rubbing fastness (rubbing resistance) in the printed material without performing a pre-treatment for the purpose of improving colorability.

SUMMARY

According to an aspect of the present disclosure, there is provided an ink jet ink set including an anionic ink containing an anionic resin, a pigment, and water, and a cationic ink containing a cationic resin, a pigment, and water, in which the anionic ink and the cationic ink are similar colors to each other, the pigment in the anionic ink is coated with the anionic resin, the pigment in the cationic ink is coated with the cationic resin, and the anionic resin or the cationic resin, or both have a urethane-based skeleton or a polyester-based skeleton.

According to another aspect of the present disclosure, there is provided a recording method using the ink jet ink set of the aspect described above, the method including ejecting the anionic ink from an ink jet head to be attached to a recording medium, and ejecting the cationic ink from the ink jet head to be attached to the recording medium, in which a region on the recording medium to which the anionic ink is attached and a region on the recording medium to which the cationic ink is attached overlap in part or as a whole.

BRIEF DESCRIPTION OF THE DRAWING

FIGURE is a schematic perspective view of an ink jet recording apparatus used in the recording method according to the present embodiment.

DESCRIPTION OF EXEMPLARY EMBODIMENTS

A description will be given below of embodiments of the present disclosure. The embodiments described below illustrate examples of the present disclosure. The present disclosure is not limited in any way to the following embodiments and also includes various modifications implemented within a range in which the gist of the present disclosure is not changed. Not all of the configurations described below may be essential configurations of the present disclosure.

1. Ink Jet Ink Set

An ink jet ink set according to one embodiment of the present disclosure is an ink jet ink set including an anionic ink containing an anionic resin, a pigment, and water, and a cationic ink containing a cationic resin, a pigment, and water, in which the anionic ink and the cationic ink are similar colors to each other, the pigment in the anionic ink is coated with the anionic resin, the pigment in the cationic ink is coated with the cationic resin, and at least one of the anionic resin and the cationic resin has a urethane-based skeleton or a polyester-based skeleton.

According to the ink jet ink set according to the present embodiment, having an anionic ink including a pigment coated with an anionic resin and a cationic ink including a pigment coated with a cationic resin makes it possible to aggregate the ink composition by mixing these two types of inks. That is, unlike the mechanism where the ink composition attaching to the recording medium treated with a cationic compound or the like causes the aggregation, aggregation of the ink composition is made possible by mixing the anionic ink and the cationic ink. Due to this, it is possible to aggregate the ink composition regardless of the presence of a pre-treatment of the recording medium and to obtain good colorability. Furthermore, the anionic ink and the cationic ink being similar colors to each other makes it possible to expand the region of colors which are able to be aggregated. That is, it is possible to obtain good colorability by aggregating each color before mixing, which was not possible with a configuration in which aggregation occurs only when two different colors are mixed.

In addition, when the ink composition is aggregated, there is a tendency for the ink composition to remain in the vicinity of the surface of the recording medium and thus to not have excellent rubbing fastness; however, at least one of the anionic resin and the cationic resin having a urethane-based skeleton or a polyester-based skeleton makes it possible to achieve a good rubbing fastness.

In the present disclosure, "being similar colors to each other" means that the difference between the hue angle of the anionic ink and the hue angle of the cationic ink is within 30 degrees. In this case, "hue angle" refers to the angle in the counter-clockwise direction, that is, the positive direction, with the red direction as 0 degrees, in the chromaticity diagram of the Lab color system. According to the chromaticity diagram of the Lab color system, every color is defined by a hue angle in a range of 0 degrees to 360 degrees. In the present embodiment, the hue angles of anionic ink and cationic ink are determined based on the results of printing with the respective inks on a recording medium. In detail, each ink was ejected onto a white cotton broad cloth such that the coating density was 39 mg/inch$^2$, then, a heating and drying treatment was carried out at 160° C. for 5 minutes using an "Economax D" conveyor drying oven manufactured by M&R and returned to 25° C. to obtain a printed material. The obtained printed material was subjected to hue angle measurement by using a colorimeter "Spectrolino" (Gretag Machbeth).

Below, each component included in the anionic ink and cationic ink forming the ink jet ink set according to the present embodiment is described separately for the anionic ink and the cationic ink.

1.1. Anionic Ink

The anionic ink forming the ink jet ink set according to the present embodiment has an anionic resin, a pigment, and water, the anionic ink and the cationic ink described below are similar colors to each other, the pigment in the anionic ink is coated with the anionic resin, and at least one of the anionic resin and the cationic resin contained in the cationic ink has a urethane-based skeleton or a polyester-based skeleton.

1.1.1. Pigment

The anionic ink forming the ink jet ink set according to the present embodiment contains a pigment. The pigments able to be used in the present embodiment are not particularly limited, but examples thereof include inorganic pigments and organic pigments. As inorganic pigments, in addition to titanium oxide and iron oxide, it is possible to use carbon black manufactured by known methods such as the contact method, the furnace method, and the thermal method.

As organic pigments, for example, it is possible to use azo pigments, polycyclic pigments, nitro pigments, nitroso pigments, aniline black, and the like. Examples of azo pigments include azo lakes, insoluble azo pigments, condensed azo pigments, chelated azo pigments, and the like. Examples of polycyclic pigments include phthalocyanine pigments, perylene pigments, perinone pigments, anthraquinone pigments, quinophthalone pigments, and the like.

Examples of pigments used in black ink include carbon black. Carbon black is not particularly limited, but examples thereof include furnace black, lamp black, acetylene black, channel black, and the like (C.I. Pigment Black 7) and commercially available products such as No. 2300, 900, MCF88, No. 20B, No. 33, No. 40, No. 45, No. 52, MA7, MA8, MA77, MA100, No. 2200B, and the like (the above are all product names, manufactured by Mitsubishi Chemical Corporation), Color Black FW1, FW2, FW2V, FW18, FW200, 5150, S160, S170, Printex 35, U, V, 140U, Special Black 6, 5, 4A, 4, 250, and the like (the above are all product names, manufactured by Degussa), Conductex SC, Raven 1255, 5750, 5250, 5000, 3500, 1255, 700, and the like (the above are all product names, manufactured by Columbian Chemicals Co.), Regal 400R, 330R, 660R, Mogul L, Monarch 700, 800, 880, 900, 1000, 1100, 1300, 1400, Elftex 12, and the like (the above are all product names, manufactured by Cabot).

The pigments used in white inks are not particularly limited, but examples thereof include white inorganic pigments of C.I. Pigment White 6, 18, 21, titanium oxide, zinc oxide, zinc sulfide, antimony oxide, magnesium oxide, and zirconium oxide. In addition to the above white inorganic pigments, it is also possible to use white organic pigments such as white hollow resin particles and polymer particles.

The pigments used in yellow ink are not particularly limited, but examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 150, 151, 153, 154, 155, 167, 172, 180, and 185.

The pigments used in magenta ink are not particularly limited, but examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254 or C.I. Pigment Violet 19, 23, 32, 33, 36, 38, 43, and 50.

The pigments used in cyan inks are not particularly limited, but examples thereof include C.I. Pigment Blue 1, 2, 3, 15, 15:1, 15:2, 15:3, 15:34, 15:4, 16, 18, 22, 25, 60, 65, 66, C.I. Vat Blue 4, and 60.

In addition, the pigments used for color inks other than magenta, cyan, and yellow are not particularly limited, but examples thereof include C.I. Pigment Green 7, 10, 36, C.I. Pigment Brown 3, 5, 25, 26, C.I. Pigment Orange 1, 2, 5, 7, 13, 14, 15, 16, 24, 34, 36, 38, 40, 43, and 63.

Pearl pigments are not particularly limited, but examples thereof include pigments having an iridescent luster or an interference luster such as titanium dioxide-coated mica, fish scale foil, and bismuth acid chloride.

Metallic pigments are not particularly limited, but examples thereof include particles formed of aluminum, silver, gold, platinum, nickel, chromium, tin, zinc, indium, titanium, copper, and the like, alone or as alloys thereof.

The lower limit value of the content of the pigment able to be included in the anionic ink is preferably 1.5% by mass or more with respect to the total mass of the anionic ink, more preferably 2% by mass or more, and even more preferably 3% by mass or more. On the other hand, the upper limit value of the content of the pigment able to be included in the anionic ink is preferably 10% by mass or less with respect to the total mass of the anionic ink, more preferably 7% by mass or less, and even more preferably 6% by mass or less. By setting the pigment content in the above ranges, the image formed on the recording medium has excellent water resistance, gas resistance, light resistance, and the like and has good preservation properties.

1.1.2. Anionic Resin

The anionic ink forming the ink jet ink set according to the present embodiment contains an anionic resin, and at least one of the anionic resin and the cationic resin described below has a urethane-based skeleton or a polyester-based skeleton. With such an embodiment, it is possible to obtain a good rubbing fastness. In the present disclosure, "urethane-based skeleton" refers to a skeleton including urethane bonds, urea bonds, allophanate bonds, or the like, formed by the reaction of isocyanate groups with other reactive groups, for example, hydroxyl groups, amino groups, urethane bonding groups, carboxy groups, and the like. In addition, in the present disclosure, "polyester-based skeleton" refers to a polyester-based skeleton including a skeleton other than a urethane-based skeleton, among skeletons including a structure obtained by polycondensation reaction between diol units and dicarboxylic acid units. At least one of the anionic resin and the cationic resin described below may have a urethane-based skeleton or a polyester-based skeleton.

The anionic resin is not particularly limited as long as the resin exhibits anionic properties in the anionic ink; however, for example, it is possible to use an anionic resin having a urethane-based skeleton, an anionic resin having a polyester-based skeleton, a styrene acrylic-based anionic resin, a polycarboxylic acid-based anionic resin, and an olefin-based anionic resin. It is possible to use these resins alone or in a combination of two or more. In addition, among these resins, an anionic resin having a urethane-based skeleton is preferable from the point of view that it is possible to further improve the rubbing fastness.

1.1.2.1. Anionic Resin having Urethane-Based Skeleton

An anionic resin having a urethane-based skeleton is a polymer synthesized by reacting a polyisocyanate, a polyol, and a monomer for imparting an anionic group.

Examples of polyisocyanates include chain aliphatic isocyanates such as tetramethylene diisocyanate, 1,6-hexamethylene diisocyanate, dodecamethylene diisocyanate, trimethylhexamethylene diisocyanate, and lysine diisocyanate, aliphatic isocyanates having a cyclic structure such as 1,3-cyclohexylene diisocyanate, 1,4-cyclohexylene diisocyanate, hydrogenated xylylene diisocyanate, isophorone diisocyanate, 4,4'-dicyclohexylmethane diisocyanate, and 3,3'-dimethyl-4,4'-dicyclohexylmethane diisocyanate, and aromatic isocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, xylylene diisocyanate, and tetramethylxylylene diisocyanate. When synthesizing an anionic resin having a urethane-based skeleton, the polyisocyanates described above may be used alone or two or more may be used in a combination.

As an anionic resin having a urethane-based skeleton, it is preferable that the urethane-based skeleton contains one or more selected from polycarbonate, polyether, and polyester, from the point of view that it is possible to further improve the rubbing fastness. Accordingly, examples of polyols include polycarbonate polyol, polyether polyol, polyester polyol, and the like.

The polycarbonate polyol is not particularly limited, but examples thereof include the reaction products of diols such as 1,3-propanediol, 1,4-butanediol, 1,6-hexanediol, diethylene glycol, polyethylene glycol, polypropylene glycol, and polytetramethylene glycol and dialkyl carbonates such as phosgene or dimethyl carbonate, or cyclic carbonates such as ethylene carbonate. The above may be used alone or two or more may be used in a combination.

Polyether polyols include polymers obtained by carrying out ring-opening polymerization or the like of cyclic ether compounds, such as ethylene oxide, propylene oxide, butylene oxide, styrene oxide, tetrahydrofuran, or epichlorohydrin, alone or in a mixture of two or more, using a compound having an active hydrogen atom as a catalyst or the like. Specifically, examples thereof include polyethylene glycol, polypropylene glycol, polytetramethylene glycol, and the like. The above may be used alone or two or more may be used in a combination.

The polyester polyols are not particularly limited, but examples thereof include polyester polyols obtained by reacting dibasic acids such as terephthalic acid, isophthalic acid, adipic acid, azelaic acid, and sebatic acid, or dialkyl esters thereof, or mixtures thereof, with glycols such as ethylene glycol, propylene glycol, diethylene glycol, butylene glycol, neopentyl glycol, 1,6-hexane glycol, 3-methyl-1,5-pentanediol, 3,3'-dimethylolheptane, polyoxyethylene glycol, polyoxypropylene glycol, and polytetramethylene ether glycol, or mixtures thereof. The above may be used alone or two or more may be used in a combination.

Examples of monomers for imparting an anionic group include monomers having a carboxyl group, a sulfonic group, or the like. Such monomers include monohydroxycarboxylic acids such as lactic acid; dihydroxycarboxylic acids such as α,α-dimethylolacetic acid, α,α-dimethylolpropionic acid, and α,α-dimethylolbutyric acid; diaminosulfonic acids such as 3,4-diaminobutanesulfonic acid and 3,6-diamino-2-toluenesulfonic acid, and the like.

1.1.2.2. Anionic Resin Having Polyester-Based Skeleton

An anionic resin having a polyester-based skeleton is a polymer obtained by polycondensation of a polyol with a polycarboxylic acid.

Examples of polyols include ethylene glycol, diethylene glycol, 1,3-propanediol, 1,4-butanediol, 1,6-hexanediol, 1,4-cyclohexanedimethanol, trimethylolpropane, pentaerythritol, and the like. When synthesizing an anionic resin having a polyester-based skeleton, the polyols described above may be used alone or two or more may be used in a combination.

Specific examples of polycarboxylic acids include oxalic acid, succinic acid, tartaric acid, malic acid, citric acid, phthalic acid, isophthalic acid, terephthalic acid, 2,6-naphthalenedicarboxylic acid, adipic acid, and the like. When synthesizing anionic resins having a polyester-based skeleton, the polycarboxylic acids described above may be used alone or two or more may be used in a combination.

1.1.2.3. Anionic Resins Having Blocked Isocyanate Groups

In addition, the anionic resin in the present embodiment may have a blocked isocyanate group from the point of view that it is possible to further improve the rubbing fastness. A blocked isocyanate group is a group in which the isocyanate group, which is a cross-linkable group, is chemically protected, that is, capped or blocked. The blocked isocyanate group is deprotected and activated by the application of heat to form bonds, for example, urethane bonds, urea bonds, allophanate bonds, or the like.

Anionic resins having blocked isocyanate groups are preferably resins having blocked isocyanate groups in an anionic resin having a urethane-based skeleton as described above. Such anionic resins tend to have better rubbing fastness. In addition, the blocked isocyanate groups of the anionic resin having a blocked isocyanate groups are preferably provided as three or more per molecule and the cross-linked structure is formed by deprotecting, activating, and reacting the blocked isocyanate groups. The anionic resin having a blocked isocyanate group in the anionic resin having a urethane-based skeleton described above may be synthesized by reacting a polyisocyanate and/or a blocked isocyanate with a polyol and a monomer for imparting an anionic group.

Blocked isocyanates (chemically protected isocyanates) contain latent isocyanate groups in which the isocyanate groups are blocked by a blocking agent and are able to be obtained, for example, by reacting a polyisocyanate compound with a blocking agent.

Examples of the polyisocyanate compound include a polyisocyanate monomer, a polyisocyanate derivative, and the like. Examples of polyisocyanate monomers include polyisocyanates such as aromatic polyisocyanates, aromatic aliphatic polyisocyanates, aliphatic polyisocyanates, and alicyclic polyisocyanates, and the like. It is possible to use these polyisocyanate monomers alone or in a combination of two or more.

Examples of polyisocyanate derivatives include multimers of the polyisocyanate monomer described above (for example, dimers, trimers (for example, isocyanurate-modified products, iminoxadiazinedione-modified products), pentamers, heptamers, and the like), allophanate-modified products (for example, allophanate-modified products produced by a reaction between the polyisocyanate monomer described above and the low-molecular weight polyols described below, and the like), polyol-modified products (for example, polyol-modified products (alcohol adducts) produced by a reaction between the polyisocyanate monomer with the low-molecular weight polyols described below, and the like), biuret-modified products (for example, biuret-modified products produced by a reaction between the polyisocyanate monomer described above with water or amines, and the like), urea-modified products (for example, urea-modified products produced by a reaction between polyisocyanate monomers described above and diamines, and the like), oxaziazine trione modified products (for example, oxadiadin trione produced by a reaction between the polyisocyanate monomer described above and carbon dioxide gas, and the like), carbodiimide modified products (carbodiimide modified products produced by a decarboxylation condensation reaction of the polyisocyanate monomer described above, and the like), urethodione-modified products, urethoneimine modified products, and the like.

In a case where two or more types of polyisocyanate compounds are used in a combination, for example, during the production of the blocked isocyanate, the two or more types of polyisocyanate compounds may be reacted at the same time or blocked isocyanates obtained by using each polyisocyanate compound individually may be mixed.

The blocking agent blocks and deactivates the isocyanate group, while also regenerating or activating the isocyanate group after de-blocking, and in addition also has a catalytic action of activating the isocyanate group in the blocked state and de-blocked state of the isocyanate group.

Examples of the blocking agents include imidazole-based compounds, imidazoline-based compounds, pyrimidine-based compounds, guanidine-based compounds, alcohol-based compounds, phenol-based compounds, active methylene-based compounds, amine-based compounds, imine-based compounds, oxime-based compounds, carbamate-based compounds, urea-based compounds, acid amide-based (lactam-based) compounds, acid imide-based compounds, triazole-based compounds, pyrazole-based compounds, mercaptan-based compounds, bisulfite salts, and the like.

Examples of imidazole-based compounds include imidazole (dissociation temperature 100° C.), benzimidazole (dissociation temperature 120° C.), 2-methylimidazole (dissociation temperature 70° C.), 4-methylimidazole (dissociation temperature 100° C.), 2-ethylimidazole (dissociation temperature 70° C.), 2-isopropylimidazole, 2,4-dimethylimidazole, 2-ethyl-4-methylimidazole, and the like.

Examples of imidazoline-based compounds include 2-methylimidazoline (dissociation temperature 110° C.), 2-phenylimidazoline, and the like.

Examples of pyrimidine-based compounds include 2-methyl-1,4,5,6-tetrahydropyrimidine, and the like.

Examples of guanidine-based compounds include 3,3-dialkylguanidines such as 3,3-dimethylguanidine, 1,1,3,3-tetraalkylguanidine such as 1,1,3,3-tetramethylguanidine (dissociation temperature 120° C.), 1,5,7-triazabicyclo [4.4.0]deca-5-ene, and the like.

Examples of the alcohol-based compounds include methanol, ethanol, 2-propanol, n-butanol, s-butanol, 2-ethylhexyl alcohol, 1- or 2-octanol, cyclohexyl alcohol, ethylene glycol, benzyl alcohol, 2,2,2-trifluoroethanol, 2,2,2-trichloroethanol, 2-(hydroxymethyl)furan, 2-methoxyethanol, methoxypropanol, 2-ethoxyethanol, n-propoxyethanol, 2-butoxyethanol, 2-ethoxyethoxyethanol, 2-ethoxybutoxyethanol, butoxyethoxyethanol, 2-butoxyethylethanol, 2-butoxyethoxyethanol, N,N-dibutyl-2-hydroxyacetamide, N-hydroxysuccinimide, N-morpholine ethanol, 2,2-dimethyl-1,3-dioxolan-4-methanol, 3-oxazolidine ethanol, 2-hydroxymethylpyridine (dissociation temperature 140° C.), furfuryl alcohol, 12-hydroxystearic acid, triphenylsilanol, 2-hydroxyethyl methacrylate, and the like.

Examples of phenol-based compounds include phenol, cresol, ethylphenol, n-propylphenol, isopropylphenol, n-butylphenol, s-butylphenol, t-butylphenol, n-hexylphenol, 2-ethylhexylphenol, n-octylphenol, n-nonylphenol, di-n-propylphenol, diisopropylphenol, isopropylcresol, di-n-butylphenol, di-s-butylphenol, di-t-butylphenol, di-n-octylphenol, di-2-ethylhexylphenol, di-n-nonylphenol, nitrophenol, bromophenol, chlorophenol, fluorophenol, dimethylphenol, styrenated phenol, methylsalicylate, methyl 4-hydroxybenzoate, benzyl 4-hydroxybenzoate, ethylhexyl 2-hydroxybenzoate, 4-[(dimethylamino)methyl]phenol, 4-[(dimethylamino)methyl]nonylphenol, bis(4-hydroxyphenyl) acetic acid, 2-hydroxypyridine (dissociation temperature 80° C.), 2- or 8-hydroxyquinoline, 2-chloro-3-pyridinol, pyridine-2-thiol (dissociation temperature 70° C.), and the like.

Examples of active methylene-based compounds include meldrumic acid, dialkyl malonate (for example, dimethyl malonate, diethyl malonate, di-n-butyl malonate, di-t-butyl malonate, di-2-ethylhexyl malonate, methyl n-butyl malonate, ethyl n-butyl malonate, methyl s-butyl malonate, ethyl s-butyl malonate, methyl t-butyl malonate, ethyl t-butyl malonate, methyl diethyl malonate, dibenzyl malonate, diphenyl malonate, methyl benzyl malonate, ethyl phenyl malonate, t-butyl phenyl malonate, isopropylidene malonate, and the like), alkyl acetoacetate (for example, methyl acetoacetate, ethyl acetoacetate, n-propyl acetoacetate, isopropyl acetoacetate, n-butyl acetoacetate, t-butyl acetoacetate, benzyl acetoacetate, phenyl acetoacetate, and the like), 2-acetoacetoxyethyl methacrylate, acetylacetone, ethyl cyanoacetate, and the like.

Examples of amine-based compounds include dibutylamine, diphenylamine, aniline, N-methylaniline, carbazole, bis (2,2,6,6-tetramethylpiperidinyl)amine, di-n-propylamine, diisopropylamine (dissociation temperature 130° C.), isopropylethylamine, 2,2,4- or 2,2,5-trimethylhexamethyleneamine, N-isopropylcyclohexylamine (dissociation temperature 140° C.), dicyclohexylamine (dissociation temperature 130° C.), bis(3,5,5-trimethylcyclohexyl)amine, piperidine, 2,6-dimethylpiperidine (dissociation temperature 130° C.), t-butyl methylamine, t-butylethylamine (dissociation temperature 120° C.), t-butyl propylamine, t-butyl butylamine, t-butyl benzylamine (dissociation temperature 120° C.), t-butylphenylamine, 2,2,6-trimethylpiperidine, 2,2,6,6-tetramethylpiperidine (dissociation temperature 80° C.), (dimethylamino)-2,2,6,6-tetramethylpiperidine, 2,2,6,6-tetramethyl-4-piperidine, 6-methyl-2-piperidine, 6-aminocaproic acid, and the like.

Examples of imine-based compounds include ethyleneimine, polyethyleneimine, 1,4,5,6-tetrahydropyrimidine, guanidine, and the like.

Examples of oxime-based compounds include formaldoxime, acetaldoxime, acetoxime, methyl ethyl ketoxime (dissociation temperature 130° C.), cyclohexanone oxime, diacetyl monoxime, benzophenooxime, 2,2,6,6-tetramethylcyclohexanone oxime, diisopropylketone oxime, methyl t-butylketone oxime, diisobutylketone oxime, methyl isobutylketone oxime, methyl isopropylketone oxime, methyl 2,4-dimethylpentylketone oxime, methyl 3-ethylheptyl ketone oxime, methyl isoamyl ketone oxime, n-amyl ketone oxime, 2,2,4,4-tetramethyl-1,3-cyclobutanedione monooxime, 4,4'-dimethoxybenzophenone oxime, 2-heptanone oxime, and the like.

Examples of carbamate-based compounds include phenyl N-phenylcarbamate, and the like.

Examples of urea-based compounds include urea, thiourea, ethylene urea, and the like.

Examples of acid amide-based (lactam-based) compounds include acetanilide, N-methylacetamide, acetic acid amide, ε-caprolactam, δ-valerolactam, γ-butyrolactam, pyrrolidone, 2,5-piperazinedione, laurolactam, and the like.

Examples of acid imide-based compounds include succinic acid imide, maleic acid imide, phthalimide, and the like.

Examples of triazole-based compounds include 1,2,4-triazole, benzotriazole, and the like.

Examples of pyrazole-based compounds include pyrazole, 3,5-dimethylpyrazole (dissociation temperature 120° C.), 3,5-diisopropylpyrazole, 3,5-diphenylpyrazole, 3,5-di-t-butylpyrazole, 3-methylpyrazole, 4-benzyl-3,5-dimethylpyrazole, 4-nitro-3,5-dimethylpyrazole, 4-bromo-3,5-dimethylpyrazole, 3-methyl-5-phenylpyrazole, and the like.

Examples of mercaptan-based compounds include butyl mercaptan, dodecyl mercaptan, hexyl mercaptan, and the like.

Examples of bisulfite salts include sodium bisulfite and the like.

Furthermore, the blocking agents are not limited to the above, but examples thereof also include other blocking agents such as benzoxazolone, isatoic anhydride, tetrabutylphosphonium acetate, and the like.

For some of the compounds illustrated above, the dissociation temperature is also listed as the temperature at which the isocyanate groups are regenerated.

It is possible to use such blocking agents alone or in a combination of two or more. It is possible to appropriately select the dissociation temperature of the blocking agent. For example, the dissociation temperature is 60° C. or higher and 230° C. or lower, preferably 80° C. or higher and 200° C. or lower, more preferably 100° C. or higher and 180° C. or lower, and even more preferably 110° C. or higher and 160° C. or lower. In the above temperature ranges, it is possible to sufficiently lengthen the pot life of the anionic ink and to set the temperature in the heating step to not be excessively high.

1.1.3. Anionic Resin-Coated Pigment

In the anionic ink forming the ink jet ink set according to the present embodiment, the pigment described above is coated with the anionic resin described above. Here, the purpose of the coating with the anionic resin is to disperse the pigment in water. When it is possible to disperse the pigment in water, it is possible to consider the anionic resin to be sufficiently coated.

Examples of preferable methods for manufacturing pigments coated with an anionic resin (also referred to below as "anionic resin-coated pigments") include the inverted-phase emulsification method. The anionic resin applied in the inverted-phase emulsification method is preferably synthesized by solution polymerization. In addition, synthesis by solution polymerization using a radical polymerization initiator is preferable. It is also possible to use a polymer dispersion liquid obtained by solution polymerization as it is in the pigment dispersion step. As an example of the inverted-phase emulsification method, it is possible to provide a pigment dispersion step in which a mixture solution including a polymer, a pigment, an organic solvent, and water in excess of the organic solvent is prepared and dispersion is carried out in the aqueous phase of the mixture solution in a state in which at least a portion of the polymer coats the pigment. It is possible to prepare an anionic ink by using the polymer and pigment present in the aqueous phase of the pigment dispersion liquid obtained in this manner in a state of being with at least a part of the aqueous phase or of being separated from the aqueous phase. It is possible to distil off the organic solvent during the inverted-phase emulsification.

It is possible to perform the pigment dispersion step as follows, for example. That is, a pigment dispersion liquid (organic solvent) is prepared by dispersing the pigment in an organic solvent, a polymer dispersion liquid in which the polymer is dispersed or dissolved in water is prepared, and the pigment dispersion liquid (organic solvent) and the polymer dispersion liquid are mixed. In this manner, it is possible to form a state in which the polymer is unevenly distributed in the vicinity of the pigment surface and coats the pigment in the aqueous phase (inverted-phase emulsification). In addition, by preparing a dispersion liquid of an organic solvent including the pigment and polymer (including one or a combination of neutralizing agents, water, and surfactants, as appropriate), and mixing the result with a large amount of water (preferably in excess of the organic solvent), the pigment and polymer are transferred from the organic solvent phase to the aqueous phase and, due to this, it is possible to form a state in which the pigment is coated with (encapsulated in) the polymer in the aqueous phase.

In the pigment dispersion step, dispersion of the pigment in the aqueous phase is performed by stirring or the like of the pigment in a mixed medium of organic solvent and water by using various dispersion methods or the like. For the pigment dispersion, in addition to ultrasonic waves, it is possible to appropriately select and use high-pressure homogenizers, ultrahigh-pressure homogenizers, high-speed mixers, sand mills, bead mills, roll mills, or the like. The pigment dispersion step in the inverted-phase emulsification method described above is preferably performed using an apparatus which mixes and stirs while providing appropriate shearing such that it is possible for the polymer and pigment to come into contact and the polymer is able to attach to the pigment surface.

The organic solvent used in the process of preparing the pigment dispersion liquid described above is not particularly limited, but considering the ease of the final distilling off of the organic solvent, an organic solvent with a low boiling point is preferable. Examples thereof include ketone-based organic solvents such as acetone and methyl ethyl ketone, ester-based organic solvents such as ethyl acetate, alcohol-based organic solvents such as ethanol and isopropyl alcohol, aromatic hydrocarbon-based organic solvents such as benzene, and the like.

To dissolve or disperse a polymer having an acidic group such as a carboxyl group in water, it is possible to use various organic amines as neutralizing agents as well as various inorganic alkalis, but inorganic alkalis are preferably used.

To separate the polymer and the pigment (which is a polymer-coated pigment) from the aqueous phase, in addition to removal, by a method such as heating, of the organic solvent from the pigment dispersion liquid having an aqueous phase in which the pigment coated with the anionic resin is dispersed, it is possible to appropriately select and perform a method such as centrifugation, water washing, ultrafiltration, and pressure filtration.

As a method for manufacturing an anionic resin-coated pigment having a urethane-based skeleton, it is possible to suitably use a manufacturing method using the following steps.

(i) A step of obtaining a polyurethane prepolymer (T).

(ii) A step of mixing a liquid in which the polyurethane prepolymer (T) is dissolved in an organic solvent (L) with a pigment (PO), refining the pigment (PO) by mechanical crushing, and obtaining an organic solvent-based pigment slurry (S).

(iii) A step of neutralizing the carboxyl group portion with a neutralizing agent (K).

(iv) A step of dispersing the obtained neutralized product in water to react the result with a chain extender (H) and a reaction stopper (J) and/or water, and then removing the organic solvent (L) as necessary.

<Manufacturing Step (i)>

The polyurethane prepolymer (T) is obtained by heating and reacting a polyester polyol (A1) and/or a polycarbonate polyol (A2) and/or a polyether polyol (A3), an aliphatic isocyanate (B1) and/or an aliphatic isocyanate having a cyclic structure (B2), and a monomer (D) having a carboxyl group, in a heatable facility. Examples thereof include a method of adding (A1) and/or (A2) and/or (A3), (B1) and/or (B2), and (D) into a container, homogenizing and stirring the result, and then carrying out heating without stirring in a heated dryer or a heated furnace, a method of heating and reacting while stirring or kneading in a simple pressurized reaction apparatus (autoclave), a Kolben flask, a uniaxial or biaxial kneader, a Plastomill, a universal kneader, or the like. Among the above, the method of heating and reacting while stirring or kneading is preferable since the homogeneity of the obtained (T) tends to be higher and the mechanical properties, durability, chemical resistance, and abrasion resistance of the obtained coating film tend to be superior.

The reaction temperature when manufacturing the polyurethane prepolymer (T) is preferably 60° C. to 120° C., more preferably 60° C. to 110° C., and most preferably 60° C. to 100° C., from the point of view of the content of allophanate groups and biuret groups in (T). In addition, it is possible to appropriately select the time for manufacturing (T) depending on the equipment used; however, generally, 1 minute to 100 hours is preferable, 3 minutes to 30 hours is more preferable, and 5 minutes to 20 hours is particularly preferable. In this range, it is possible to obtain (T) which is able to sufficiently exhibit the effect of the present disclosure.

It is possible to dilute the polyurethane prepolymer (T) by using the organic solvent (L). Examples of organic solvents (L) include ketone-based solvents (acetone, methyl ethyl ketone, methyl isobutyl ketone, and the like), ester-based solvents (ethyl acetate, butyl acetate, γ-butyrolactone, and the like), ether-based solvents (THF, and the like), amide-based solvents [N,N-dimethylformamide, N,N-dimethylacetamide, N-methyl-2-pyrrolidone, N-methylcaprolactam, and the like], alcohol-based solvents (methanol, ethanol, isopropyl alcohol, and the like), and aromatic hydrocarbon-based solvents (toluene, xylene, and the like), and the like. One of these organic solvents may be used alone or two or more may be used in a combination. Among the above, amide-based solvents are preferable from the point of view of solubility of the polyurethane prepolymer (T).

The organic solvent (L) may be added at any time before the urethanization reaction, during the urethanization reaction, after the urethanization reaction, or before emulsification, but use before the urethanization reaction is preferable from the point of view of the homogeneity of the reaction system.

In order to control the urethanization reaction rate, it is possible to use known reaction catalysts (tin octylate, bismuth octylate, and the like), reaction retardants (phosphoric acid and the like), and the like. The added amount of these catalysts or reaction retardants is preferably 0.001% by weight to 3% by weight based on the weight of (T), more preferably 0.005% by weight to 2% by weight, and particularly preferably 0.01% by weight to 1% by weight.

<Manufacturing Step (ii)>

As the apparatus for mixing the polyurethane prepolymer (T) and the pigment (PO), it is possible to use the apparatus used for the synthesis of (T) as it is. As dispersing machines used when refining the pigment (PO) by mechanical crushing, for example, it is possible to exemplify paint shakers, ball mills, sand mills, and nano mills. Specifically, there are an SC Mill (manufactured by Nippon Coke & Engineering, Co., Ltd.), TSU-6U (manufactured by AIMEX Co., Ltd.), Labstar Mini HFM02 (manufactured by Ashizawa Finetech Ltd.), and the like.

<Manufacturing Step (iii)>

As necessary, the carboxyl group portion introduced into the polyurethane prepolymer (T) is neutralized with the neutralizing agent (K). The neutralizing agent (K) may be added at any time before the urethanization reaction, during the urethanization reaction, after the urethanization reaction, before emulsification, during emulsification, or after dispersion in an emulsified aqueous medium, but from the point of view of stability of the urethane resin and stability of the dispersion of composite particles for ink, it is preferable to add the neutralizing agent (K) before emulsification or during emulsification.

The neutralizing agent used in (K) may be added at any time before the urethanization reaction, during the urethanization reaction, or after the urethanization reaction, before the water dispersion step, during the water dispersion step, or after the water dispersion step, but from the point of view of the stability of the urethane resin and the stability of the water dispersion, the addition is preferably carried out before the water dispersion step or during the water dispersion step. In addition, the neutralizing agent volatilized during desolvation may be additionally added after desolvation and it is possible to freely select the neutralizing agent type to be additionally added from the neutralizing agents described above.

The amount of (K) used is adjusted such that the content of the monomer having carboxyl groups is 23 mg/g to 80 mg/g based on the weight of the polyurethane resin (U), from the point of view of stability of the anionic resin-coated pigment aqueous dispersion. The neutralization rate of the carboxyl group in the neutralization step is preferably 20% to 100% from the point of view of dispersion stability, and even more preferably 60% to 100%.

<Manufacturing Step (iv)>

Examples of the method for emulsifying the neutralized product obtained in step (iii) include a method of carrying out dispersion in an aqueous medium in the presence of the organic solvent (L), a dispersant (e), the chain extender (H), and the reaction stopper (J) as necessary, causing a reaction until the isocyanate groups are practically eliminated [chain extension by water or (H) and reaction stopping by (J) as necessary], and distilling off the used organic solvent (L) as necessary.

The aqueous medium in the present disclosure refers to water and a mixture of water and the organic solvent (L). The organic solvent used in the aqueous medium is preferably a water-soluble organic solvent from the point of view of dispersibility. In a case where the organic solvent (L) is used, the organic solvent may be distilled off as necessary during the manufacturing and/or after the manufacturing of the anionic resin-coated pigment water dispersion.

Examples of the dispersant (e) include nonionic surfactants, anionic surfactants, cationic surfactants, amphoteric surfactants, and other emulsifying dispersants. (e) may be used alone or it is also possible to use two or more in a combination.

The method of the apparatus for adding water and dispersing the anionic resin-coated pigment (P) while stirring the slurry (S) is not particularly limited, but examples thereof include (1) an anchor-type stirring method, (2) a rotor-stator method [for example, a homomixer (manufactured by AS ONE Corporation)], (3) a line mill method [for example, a line flow mixer], (4) a static tube mixing method [for example, a static mixer], (5) a vibration method [for example, "VIBRO MIXER" (manufactured by Reica Co., Ltd.)], (6) an ultrasonic impact method [for example, an ultrasonic homogenizer], (7) high pressure impact method [for example, a Gaulin homogenizer (manufactured by Gaulin)], (8) a membrane emulsification method [for example, a membrane emulsification module], (9) a centrifugal thin-film contact type [for example, "Filmix" (manufactured by Primix Corporation)], and other emulsifying devices. Among the above, (2) is preferable.

1.1.4. Water

The anionic ink forming the ink jet ink set according to the present embodiment contains water as the main solvent. Pure water or ultrapure water such as ion exchanged water, ultrafiltered water, reverse osmosis water, or distilled off water is preferably used as the water. In particular, the use of water subjected to a sterilization treatment by ultraviolet irradiation, hydrogen peroxide addition, or the like is preferable in terms of preventing the generation of mold and bacteria to enable long-term storage of the ink composition.

The water content is not particularly limited, but 30% by mass or more is preferable with respect to the total mass of the anionic ink, 35% by mass or more is more preferable, and 40% by mass or more is particularly preferable.

1.1.5. Other Components

The anionic ink forming the ink jet ink set according to the present embodiment may contain components other than the components described above. Examples of such components are shown below.

<Wetting Agent>

The anionic ink forming the ink jet ink set according to the present embodiment preferably contains an organic solvent with a wetting effect for the purpose of preventing clogging in the vicinity of the nozzle of the ink jet head.

Examples of wetting agents include polyhydric alcohols such as glycerin, 1,2,6-hexantriol, trimethylolpropane, pentamethylene glycol, trimethylene glycol, ethylene glycol, propylene glycol, diethylene glycol, triethylene glycol, tetraethylene glycol, pentaethylene glycol, polyethylene glycol with an average molecular weight of 2000 or less, dipropylene glycol, tripropylene glycol, isobutylene glycol, 2-butene-1,4-diol, 2-ethyl-1,3-hexanediol, 2-methyl-2,4-pentanediol, mesoerythritol, and pentaerythritol, sugars such as glucose, mannose, fructose, ribose, xylose, arabinose, galactose, aldonic acid, glucitol (sorbitol), maltose, cellobiose, lactose, sucrose, trehalose, and maltotriose, so-called solid wetting agents such as sugar alcohols, hyaluronic acid, and urea, alkyl alcohols with 1 to 4 carbon atoms such as ethanol, methanol, butanol, propanol, and isopropanol, 2-pyrrolidone, N-methyl-2-pyrrolidone, 1,3-dimethyl-2-imidazolidinone, formamide, acetamide, dimethyl sulfoxide, sorbit, sorbitan, acetin, diacetin, triacetin, sulfolane, and the like.

One wetting agent may be used alone or two or more may be used in a combination.

The content of the wetting agent is preferably 2.0% by mass or more and 20.0% by mass or less with respect to the total mass of the anionic ink, and more preferably 5.0% by mass or more and 15.0% by mass or less. When the content of the wetting agent is in the range described above, it may be possible to ensure appropriate property values (such as viscosity) of the anionic ink and to ensure the quality and reliability of recording.

<Surfactant>

The anionic ink forming the ink jet ink set according to the present embodiment preferably contains a surfactant. It is possible to use the surfactant as a wetting agent to adjust the wettability, that is, the permeability to the recording medium, by lowering the surface tension of the anionic ink. In addition, the anionic ink containing the surfactant ensures the ejection stability from the ink jet head.

As surfactants, it is possible to use any of nonionic surfactants, anionic surfactants, cationic surfactants, and amphoteric surfactants, and the above may also be used in a combination. In addition, among the surfactants, it is possible to preferably use acetylene glycol-based surfactants, silicone-based surfactants, and fluorine-based surfactants.

The acetylene glycol-based surfactants are not particularly limited, but examples thereof include Surfynol (registered trademark) 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (the above are product names, manufactured by Nissin Chemical Co., Ltd.), Olfine (registered trademark) B, Y, P, A, STG, SPC, E1004, E1010, PD-001, PD-002W, PD-003, PD-004, PD-005, EXP.4001, EXP.4300, EXP.4036, EXP.4051, AF-103, AF-104, AK-02, SK-14, AE-3 (the above are product names, manufactured by Nissin Chemical Co., Ltd.), and Acetylenol (registered trademark) E00, E00P, E40, and E100 (the above are product names, manufactured by Kawaken Fine Chemicals Co., Ltd.).

Silicone-based surfactants are not particularly limited, but preferable examples thereof include polysiloxane compounds. Polysiloxane-based compounds are not particularly limited, but examples thereof include polyether-modified organosiloxane. Examples of commercial products of such polyether-modified organosiloxanes include BYK (registered trademark)-306, BYK-307, BYK-333, BYK-341, BYK-345, BYK-346, BYK-348, BYK-349 (the above are product names, manufactured by BYK), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (the above are product names, manufactured by Shin-Etsu Chemical Co., Ltd.), and the like.

As fluorine-based surfactants, it is preferable to use a fluorine-modified polymer, which is not particularly limited, but examples thereof include BYK (registered trademark)-340 (product name, manufactured by BYK Chemie Japan KK.).

In a case where the anionic ink contains a surfactant, it is possible to use a plurality of the above surfactants and the total content thereof is preferably 0.01% by mass or more and 3.0% by mass or less with respect to the anionic ink, more preferably 0.05% by mass or more and 2.0% by mass or less, even more preferably 0.1% by mass or more and 1.5% by mass or less, and particularly preferably 0.2% by mass or more and 1.0% by mass or less.

<Others>

In addition to the components described above, the anionic ink forming the ink jet ink set according to the present embodiment may contain preservatives/fungicides, rust inhibitors, chelating agents, viscosity regulators, antioxidants, ureas, amines, sugars, and the like.

1.2. Cationic Ink

The cationic ink forming the ink jet ink set according to the present embodiment contains a cationic resin, a pigment, and water, the cationic ink and the anionic ink are similar colors to each other, the pigment in the cationic ink is coated with the cationic resin, and at least one of the cationic resin and the anionic resin contained in the anionic ink has a urethane-based skeleton or a polyester-based skeleton.

1.2.1. Pigment

The cationic ink forming the ink jet ink set according to the present embodiment contains a pigment. The pigment is the same as in the anionic ink described above and is therefore not described.

1.2.2. Cationic Resin

The cationic ink forming the ink jet ink set according to the present embodiment contains a cationic resin and at least one of the cationic resin and the anionic resin described above has a urethane-based skeleton or a polyester-based skeleton. With such an embodiment, it is possible to obtain a good rubbing fastness.

The cationic resin is not particularly limited as long as cationic properties are exhibited in the cationic ink, but, for example, it is possible to use a cationic resin having a urethane-based skeleton, a cationic resin having a polyester-based skeleton, an acrylic-based cationic resin, a polyammonium salt-based cationic resin, an olefin-based cationic resin, and the like. It is possible to use these resins alone or in a combination of two or more. In addition, among these resins, a cationic resin having a urethane-based skeleton is preferable from the point of view that it is possible to further improve the rubbing fastness.

1.2.2.1. Cationic Resin Having Urethane-Based Skeleton

A cationic resin having a urethane-based skeleton is a polymer synthesized by reacting polyisocyanate, polyol, and a compound for imparting cationic properties.

The polyisocyanate is the same as in the anionic ink described above and is therefore not described.

The polyol is the same as the anionic ink described above and is therefore not described.

Examples of the compounds for imparting cationic properties include various ammonium salts such as primary ammonium salts, secondary ammonium salts, tertiary ammonium salts, quaternary ammonium salts, and the like, more specifically, (mono)alkylamine salts, dialkylamine salts, trialkylamine salts, tetraalkylamine salts, benzalkonium salts, alkylpyridium salts, imidazolinium salts, and the like.

1.2.2.2. Cationic Resin Having Ester-Based Skeleton

Cationic resins having an ester-based skeleton are polymers obtained by polycondensation of a polyol with a cationic polymer.

Examples of the polyol include ethylene glycol, diethylene glycol, 1,3-propanediol, 1,4-butanediol, 1,4-cyclohexanedimethanol, trimethylolpropane, pentaerythritol, and the like. When synthesizing an anionic resin having a polyester-based skeleton, the polyols described above may be used alone or two or more may be used in a combination.

Examples of cationic polymers include polymers having primary to tertiary amines and quaternary ammonium salts in the molecule, specifically, polyalkylene polyamines such as polyethylene polyamine and polypropylene polyamine or derivatives thereof, acrylic resins having secondary amines, tertiary amines, and quaternary ammonium salts, polyvinylamines, polyvinylamidines, dicyanide-based cationic resins represented by dicyandiamide-formalin polycondensation products, polyamine-based cationic resins represented by dicyandiamide-diethylenetriamine polycondensation products, epichlorohydrin-dimethylamine addition polymerization products, dimethyl diallylammonium chloride polymerization products, diallylamine salt polymerization products, dimethyl diallylammonium chloride polymerization products, allylamine salt polymerization products, dialkylaminoethyl (meth)acrylate quaternary salt polymerization products, acrylamide-diallylamine salt copolymerization products, polyvinyl alcohol-cationic monomer graft polymerization products, and the like.

1.2.2.3. Cationic Resin Having Blocked Isocyanate Group

In addition, the cationic resin in the present embodiment may have a blocked isocyanate group from the point of view that it is possible to further improve the rubbing fastness. The cationic resin having a blocked isocyanate group is preferably a resin having a blocked isocyanate group in the cationic resin having a urethane-based skeleton described above. Such cationic resins tend to have better rubbing fastness.

The polyisocyanate compound, blocking agent, and the like used for the blocked isocyanate group are the same as in the anionic ink described above, and are therefore not described.

1.2.3. Cationic Resin-Coated Pigment

In the cationic ink forming the ink jet ink set according to the present embodiment, the pigments described above are coated with the cationic resin described above.

Preferable methods for manufacturing a pigment coated with a cationic resin (also referred to below as "cationic resin-coated pigment") are the same as for the anionic resin-coated pigment described above and are therefore not described.

The water included in the cationic ink which forms the ink jet ink set according to the present embodiment and other components able to be included therein are the same as for the anionic ink described above and are therefore not described.

1.3. Method of Preparing Anionic Ink and Cationic Ink

In the present embodiment, the anionic ink and the cationic ink are obtained by mixing the components described above in any order and removing impurities by filtration or the like as necessary. As the method of mixing each component, a method of adding materials sequentially to a container provided with a stirring apparatus such as a mechanical stirrer or magnetic stirrer and carrying out stirring and mixing is suitably used. As a filtration method, it is possible to perform centrifugal filtration, filter filtration, or the like, as necessary.

1.4. Physical Properties of Anionic Ink and Cationic Ink

In the present embodiment, from the point of view of balancing image quality and reliability as ink for ink jet recording, the anionic ink and the cationic ink preferably have a surface tension at 20° C. of 20 mN/m or more and 40 mN/m or less, and more preferably 20 mN/m or more and 35 mN/m or less. It is possible to measure the surface tension, for example, using an automatic surface tension meter CBVP-Z (product name, manufactured by Kyowa Interface Science Co., Ltd.) to confirm the surface tension when a platinum plate is wetted with ink in an environment of 20° C.

In addition, from the same point of view, in the present embodiment, the viscosity of the anionic ink and the cationic ink at 20° C. is preferably 3 mPa·s or more and 10 mPa·s or less, and more preferably 3 mPa·s or more and 8 mPa·s or less. It is possible to measure the viscosity, for example, using a viscoelasticity testing machine MCR-300 (product name, manufactured by Physica) in an environment of 20° C.

2. Recording Method

A recording method according to one embodiment of the present disclosure is a recording method using the ink jet ink set of the embodiment described above, the method including an anionic ink attaching step of ejecting the anionic ink from an ink jet head to be attached to a recording medium, and a cationic ink attaching step of ejecting the cationic ink from the ink jet head to be attached to the recording medium, in which a region on the recording medium to which the anionic ink is attached and a region on the recording medium to which the cationic ink is attached overlap in part or as a whole.

According to the recording method according to the present embodiment, even in a case where a pre-treatment with a cationic compound or the like is not performed on the recording medium for the purpose of improving the colorability, it is possible to obtain good colorability of the printed material and excellent rubbing fastness (rubbing resistance). Accordingly, using the recording method according to the present embodiment makes it possible to eliminate a complicated pre-treatment step, which mainly needs to be performed manually, and to make the steps of the recording method in-line. In addition, since the ink composition is aggregated by mixing the anionic ink and the cationic ink, it is possible to obtain good colorability and blotting reduction regardless of the presence of a pre-treatment of the recording medium, that is, regardless of the surface charge state of the recording medium.

Below, regarding the recording method according to the present embodiment, a description will be given of the ink jet recording apparatuses applicable to the recording method according to the present embodiment, the recording medium, and each step of the recording method, in order.

2.1. Ink Jet Recording Apparatus

A description will be given of an example of an ink jet recording apparatus with which the recording method according to the present embodiment is implemented, with reference to the drawing. FIGURE is a schematic sectional view schematically showing an ink jet recording apparatus. As shown in FIGURE, an ink jet recording apparatus 1 is provided with an ink jet head 2, an IR heater 3, a platen heater 4, a curing heater 5, a cooling fan 6, a pre-heater 7, and a ventilation fan 8. The ink jet recording apparatus 1 is provided with a control unit, which is not shown, and the operation of the entire ink jet recording apparatus 1 is controlled by the control unit.

The ink jet head 2 is a unit which ejects and attaches anionic ink and cationic ink (also collectively referred to below as the "ink composition" or simply "ink") with respect to a recording medium M.

The ink jet head 2 is provided with nozzles (not shown) which eject the ink composition. Examples of methods for ejecting ink from nozzles include a method (electrostatic suction method) of applying a strong electric field between the nozzles and an accelerating electrode placed in front of the nozzles, continuously ejecting ink in droplet form from the nozzles, and carrying out the ejection to correspond to a recording information signal while the ink droplets fly between deflecting electrodes; a method for forcibly ejecting ink droplets by using a small pump to apply pressure to the ink and mechanically vibrating the nozzle with a crystal resonator or the like; a method (piezo method) for ejecting ink droplets by applying pressure to the ink with a piezo-electric element at the same time as a recording information signal to carry out recording; a method (thermal jet method) for ejecting ink droplets by heating and foaming ink using microelectrodes according to a recording information signal to carry out recording; and the like.

As the ink jet head 2, it is possible to use both line ink jet heads and serial ink jet heads.

Here, an ink jet recording apparatus provided with a serial ink jet head is an apparatus in which recording is performed by performing a plurality of scans (passes) in which the ink composition is ejected while the ink jet head for recording is moved relatively with respect to the recording medium. Specific examples of serial-type ink jet heads include heads in which the ink jet head is mounted on a carriage which moves in the width direction of the recording medium, that is, in a direction which intersects the transport direction of the recording medium, and in which the ink jet head moves in accordance with the movement of the carriage to eject droplets on the recording medium.

On the other hand, an ink jet recording apparatus provided with a line-type ink jet head performs recording by performing a single scanning (pass) in which an ink composition is ejected while moving the ink jet head for recording relatively with respect to the recording medium. Specific examples of line-type ink jet heads include heads in which the ink jet head is formed to be wider than the width of the recording medium and the ink jet head for recording ejects droplets on the recording medium without moving.

In the present embodiment, an ink jet recording apparatus provided with a serial ink jet head is used as the ink jet recording apparatus 1 and the ink jet head 2 using a piezo method as the method for ejecting ink from the nozzle is used.

The ink jet recording apparatus 1 is provided with the IR heater 3 and the platen heater 4 for heating the recording medium M at the time of ejection of the ink composition from the ink jet head 2, that is, for primary heating or primary drying. In the present embodiment, at least one of the IR heater 3 and the platen heater 4 may be used when heating the recording medium M in the ink composition attachment step described below.

When the IR heater 3 is used, it is possible to heat the recording medium M from the ink jet head 2 side. Due to this, although the ink jet head 2 is easily heated at the same time, it is possible to increase the temperature without being affected by the thickness of the recording medium M, in comparison with a case where the recording medium M is heated from the back surface, such as with the platen heater 4. In addition, when the platen heater 4 is used when heating the recording medium M, it is possible to heat the recording medium M from the opposite side to the ink jet head 2 side. Due to this, it is relatively difficult to heat the ink jet head 2.

The upper limit of the surface temperature of the recording medium M according to the IR heater 3 and the platen heater 4 is preferably 45° C. or lower, more preferably 40° C. or lower, and even more preferably 35° C. or lower. In addition, the lower limit of the surface temperature of the recording medium M is preferably 25° C. or higher, more preferably 28° C. or higher, and even more preferably 30° C. or higher. Due to this, the radiation heat received from the IR heater 3 and the platen heater 4 is reduced or eliminated, thus, it is possible to suppress drying and compositional variations of the ink composition in the ink jet head 2 and the welding of ink and resin to the inner wall of the ink jet head 2 is suppressed. In addition, it is possible to fix the ink at an early stage and to improve the image quality.

The curing heater 5 dries and solidifies the ink composition attached to the recording medium M, that is, the heater is a heater for secondary heating or secondary drying. When the curing heater 5 heats the recording medium M on which an image is recorded, moisture and the like included in the ink composition evaporates and scatters more rapidly and an ink film is formed by the resin included in the ink composition. In this manner, the ink film is firmly fixed or bonded on the recording medium M to obtain excellent film-forming properties and it is possible to obtain excellent, high-quality images in a short time. The upper limit of the surface temperature of the recording medium M according to the curing heater 5 is preferably 120° C. or lower, more preferably 100° C. or lower, and even more preferably 90° C. or lower. In addition, the lower limit of the surface temperature of the recording medium M is preferably 60° C. or higher, more preferably 70° C. or higher, and even more preferably 80° C. or higher. By setting the temperature in the above range, it is possible to obtain high quality images in a short time.

The ink jet recording apparatus 1 may have the cooling fan 6. After drying the ink composition recorded on the recording medium M, the ink composition on the recording medium M is cooled by the cooling fan 6 such that it is possible to form an ink coating film with good adhesion on the recording medium M.

In addition, the ink jet recording apparatus 1 may be provided with the pre-heater 7 to heat the recording medium M in advance before the ink composition is attached to the recording medium M. Further, the recording apparatus 1 may be provided with the ventilation fan 8 to allow the ink composition attached to the recording medium M to dry more efficiently.

2.2. Recording Medium

It is possible to use the recording method according to the present embodiment for recording with respect to various recording media.

The recording medium is not particularly limited and it is also possible to use not only fabrics such as cotton, silk, polyester, polyurethane, and nylon, blends of the different fibers described above, plain paper, and ink jet paper, which have high ink absorbency, medium absorbency fine paper and copy paper, but also low-absorbent or non-absorbent recording media; however, fabrics are preferable.

The low-absorbent recording media are not particularly limited, but examples thereof include coated paper with a coating layer provided by coating a coating material on the surface thereof. The coated paper is not particularly limited, but examples thereof include printing papers such as art paper, coating paper, and matte paper.

Non-absorbent recording media are not particularly limited, but examples thereof include a plastic film which does not have an ink-absorbing layer, a medium in which plastic is coated on a substrate such as paper, a medium to which a plastic film is bonded, and the like. Examples of the plastics referred to here include polyvinyl chloride, polyethylene terephthalate, polycarbonate, polystyrene, polyurethane, polyethylene, polypropylene, and the like.

Here, "low-ink absorbent or non-absorbent recording medium" refers to "a recording medium in which the amount of water absorbed in 30 msec$^{1/2}$ from the start of contact is 10 mL/m$^2$ or less, according to the Bristow method". The Bristow method is the most widespread method as a method for measuring an amount of liquid absorbed in a short time and is also adopted by the Japan Technical Association of the Pulp and Paper Industry (JAPAN TAPPI). The details of the test method are described in Standard No. 51 "Paper and Paperboard—Liquid Absorption Test Method—Bristow Method" of "JAPAN TAPPI Paper and Pulp Test Methods 2000 Edition".

In addition, in the present embodiment, the fabric may be treated with a treatment solution composition (also simply referred to below as a "treatment solution"). The treatment solution composition is used by being attached in advance to the fabric, which is the base material of the printed matter, during ink jet textile printing and contains, for example, a cationic compound and the water or organic solvent described above.

The cationic compound has a function of aggregating the components in the ink composition. For this reason, when the ink composition is attached to the fabric to which the treatment solution is attached, the cationic compound promotes the aggregation of the ink particles or increases the viscosity of the ink to suppress absorption into the gaps or interior of the fibers forming the fabric. In this manner, since the cationic compound keeps the ink on the surface of the fabric, the colorability of the ink in the printed matter is improved. In addition, smudging and bleeding are suppressed.

Examples of cationic compounds include polyvalent metal salts such as calcium salts and magnesium salts, cationic resins such as cationic urethane resins, olefin resins, and allylamine resins, cationic surfactants, inorganic acids or organic acids, and the like. Among the above, the use of polyvalent metal salts is preferable in terms of improving the colorability of the pigments and being suitable for cotton fabrics. These cationic compounds may be used alone or two or more may be used in a combination.

The amount of the cationic compound included in the treatment solution is not particularly limited; however, the amount is preferably 0.1% by mass or more with respect to the total amount of the treatment solution, more preferably 2.0% by mass or more, and even more preferably 5.0% by mass or more. In addition, the content of the cationic compound in the treatment solution is preferably 40.0% by mass or less with respect to the total amount of the treatment solution, more preferably 25.0% by mass or less, and even more preferably 10.0% by mass or less. By setting the content of the cationic compound in the above range, the precipitation, separation, or the like of the cationic compound in the treatment solution is suppressed, the aggregation of pigments in the ink is promoted, and absorption into the gaps or interior of the fibers forming the fabric is suppressed. Due to this, the phenomenon of the color material passing through to the rear in the direction of the back surface of the printing surface is reduced and the colorability of the printed matter is improved.

2.3. Steps

A description will be given of each step of the recording method according to the present embodiment by using an example of recording using the ink jet recording apparatus and ink jet ink set described above.

2.3.1. Anionic Ink Attachment Step

The anionic ink attachment step is a step in which the anionic ink described above is ejected from the ink jet head 2 of FIGURE and imparted to the recording medium M. Through this step, the anionic ink is imparted to the surface of the recording medium M.

The maximum attachment amount of the anionic ink per unit area of the recording medium M is preferably 5 mg/inch$^2$ or more, more preferably 7 mg/inch$^2$ or more, and even more preferably 10 mg/inch$^2$ or more. The upper limit of the attachment amount of the anionic ink per unit area of the recording medium is not particularly limited, but, for example, 20 mg/inch$^2$ or less is preferable, 18 mg/inch$^2$ or less is more preferable, and 16 mg/inch$^2$ or less is particularly preferable.

The anionic ink attachment step may be provided with a heating step in which the recording medium M is heated by the IR heater 3 or the platen heater 4 before the anionic ink attachment step or at the same time as the anionic ink attachment step, and it is preferable to perform the anionic ink attachment step on the recording medium M heated by the heating step. Due to this, it is possible for the ink to dry quickly on the recording medium M and bleeding is suppressed. In addition, it is possible to form an image with excellent image quality and to provide a recording method with low VOC generation.

The upper limit of the surface temperature (primary heating temperature) of the recording medium M when imparting the anionic ink is preferably 45° C. or lower, more preferably 40° C. or lower, and even more preferably 38° C. or lower. By setting the surface temperature of the recording medium in the above range when the anionic ink is imparted, it is possible to suppress the effect of heat on the ink jet head 2 and to prevent clogging of the ink jet head 2 and nozzles. In addition, the lower limit of the surface temperature of the recording medium M during ink jet recording is preferably 25° C. or higher, more preferably 28° C. or higher, even more preferably 30° C. or higher, and particularly preferably 32° C. or higher. By setting the surface temperature of the recording medium M in the above range during ink jet recording, it is possible to quickly dry and fix the ink on the recording medium M at an early stage, bleeding is suppressed, and it is possible to form an image with excellent rubbing resistance and image quality.

2.3.2. Cationic Ink Attachment Step

The cationic ink attachment step is a step in which the cationic ink described above is attached to the recording medium M so as to overlap, in part or as a whole, with the region to which the anionic ink was or is to be imparted in the anionic ink attachment step. The cationic ink attachment step may be performed after the anionic ink attachment step, before the anionic ink attachment step, or at the same time as the anionic ink attachment step.

Here, the term "region to which the anionic ink was or is to be imparted" means the region to which the dots of the anionic ink were or are to be attached.

In this specification, a case of using "region" refers to a portion on the recording medium which occupies a certain area such that the attachment amount of ink composition attached to the region is approximately constant. A region is a region able to be visually seen as the same color, for example, an area of 1 mm$^2$ or more. In addition, the attachment amount being approximately constant means that, for example, in a case where Duty is low, the attachment amount of the ink composition is strictly different between the position where the ink composition dot is landed and the position where the ink composition dot is not landed, but the region means a macroscopic (macro) range larger than the area of one dot, and, macroscopically, the attachment amount of the ink composition is constant within the region and non-homogeneity of the attachment amount due to the presence of the ink dot is to be ignored.

In addition, in a case of a low Duty, even in a region where both an anionic ink and a cationic ink are attached, microscopically, for example, there may be portions present where the anionic ink and cationic ink do not overlap at a scale of droplets (landed dots) in the ink jet method; however, assuming that the overlap of the ink composition is viewed macroscopically, the fact that there are portions where the dots do not overlap in a case of being viewed on a dot-by-dot basis is to be ignored. Accordingly, here, it is considered that the attachment region is the region where the anionic ink and cationic ink overlap in the region as a whole.

In the present specification, "Duty" is the value calculated by equation (1).

Duty (%)={Actual number of dots printed/(Vertical resolution×Horizontal resolution)}×100 . . . (1) (In the equation, "Actual number of dots printed" is the actual number of dots printed per unit area and the "Vertical resolution" and "Horizontal resolution" are the resolution per unit area, respectively.)

In a case where the cationic ink is attached to the recording medium so as to overlap, in part or as a whole, with the region to which the anionic ink was imparted, the cationic ink may be attached so as to overlap with at least a part of the region to which the anionic ink was imparted. Specifically, the cationic ink is preferably attached such that 50% or more of the region to which the anionic ink was imparted is overlapped, more preferably attached such that 60% or more is overlapped, and even more preferably attached such that 70% or more is overlapped. By imparting the cationic ink in this manner, it is possible to effectively mix the anionic ink and the cationic ink and there is a tendency for the colorability and rubbing resistance to be favorable.

The maximum attachment amount of the cationic ink per unit area of the recording medium M is preferably 5 mg/inch$^2$ or more, more preferably 7 mg/inch$^2$ or more, and even more preferably 10 mg/inch$^2$ or more. The upper limit of the attachment amount of the ink composition per unit area of the recording medium is not particularly limited, but for example, 20 mg/inch$^2$ or less is preferable, 18 mg/inch$^2$ or less is more preferable, and 16 mg/inch$^2$ or less is particularly preferable.

In the same manner as the anionic ink attachment step described above, the cationic ink attachment step may be provided with a heating step in which the recording medium M is heated by the IR heater 3 or the platen heater 4 before the cationic ink attachment step or at the same time as the cationic ink attachment step, and it is preferable to perform the cationic ink attachment step on the recording medium M heated by the heating step. Due to this, it is possible to quickly dry the ink on the recording medium M.

The upper limit of the surface temperature of the recording medium M when attaching the cationic ink is preferably 45° C. or lower, more preferably 40° C. or lower, and particularly preferably 38° C. or lower. By setting the surface temperature of the recording medium when attaching the ink in the above range, it is possible to suppress the effect of heat on the ink jet head 2 and to prevent clogging of the ink jet head 2 and nozzles. In addition, the lower limit of the surface temperature of the recording medium M during ink jet recording is preferably 25° C. or higher, more preferably 28° C. or higher, even more preferably 30° C. or higher, and particularly preferably 32° C. or higher. By setting the surface temperature of the recording medium M in the above range, it is possible to quickly dry and fix the ink on the recording medium M at an early stage.

2.3.3. Other Steps

After the anionic ink attachment step and the cationic ink attachment step described above, the recording method according to the present embodiment may have a secondary heating step in which the recording medium M to which the ink composition is attached is heated by the curing heater 5 shown in FIGURE. Due to this, the fixing resin and the like included in the ink composition on the recording medium M are melted to form an ink film and the ink film is firmly fixed (bonded) on the recording medium M to have an excellent film-forming property, thus, it is possible to obtain a high-quality image with excellent rubbing resistance in a short time.

The upper limit of the surface temperature of the recording medium M by the curing heater 5 is preferably 120° C. or lower, more preferably 110° C. or lower, and even more preferably 100° C. or lower. In addition, the lower limit of the surface temperature of the recording medium M is preferably 60° C. or higher, more preferably 70° C. or higher, and even more preferably 80° C. or higher. By setting the temperature in the above range, it is possible to obtain a high-quality image in a short time.

After the secondary heating step, there may be a step of cooling the ink composition on the recording medium M by the cooling fan 6 shown in FIGURE.

In addition, the recording method according to the present embodiment may be provided with a cleaning step in which the ink composition is discharged by a unit other than the pressure generating unit for ejecting ink for recording, that is, by other mechanisms than the mechanism for ejecting ink for recording provided in the ink jet head 2.

Examples of the mechanism for ejecting ink for recording provided in the ink jet head 2 include a piezo element provided in a pressure chamber (not shown) and imparting pressure to the ink or a heater element. The cleaning step may be a step in which pressure is imparted to the ink jet head 2 from outside to discharge the ink composition or a treatment solution from the nozzles. By providing this step, even in a case where there is a concern that resin may be welded to the inner wall of the ink jet head 2, it is possible to suppress such welding and to further improve the ejection stability.

Examples of the other mechanisms described above include a mechanism of imparting pressure, such as imparting suction (negative pressure) or imparting positive pressure from upstream of the ink jet head. The above are not ink discharging (flushing) due to the function of the ink jet head itself. In other words, the ink is not discharged using the function to eject ink from the ink jet head during recording.

3. Examples

A more detailed description will be given of the present disclosure through examples, but the present disclosure is not limited to these examples. Below, "%" and "parts" are based on mass, unless otherwise stated.

3.1. Preparation of Dispersion Liquid

Anionic dispersion liquids 1 to 17, cationic dispersion liquids 1 to 17, and other dispersion liquids 1 to 6 were prepared in the blending amounts shown in Tables 1 to 3 below. For the pigments and dispersants, the values are shown in terms of solid content. In Tables 1 to 3 below, "Y" represents yellow, "M" represents magenta, "C" represents cyan, "K" represents black, and "W" represents white. In Tables 1 to 3 below, "PCD" represents polycarbonate diol, "PES" represents polyester diol, "PE" represents polyether diol, and "BI" represents including a blocked isocyanate group.

TABLE 1

| | | | Anionic dispersion liquid 1 | Anionic dispersion liquid 2 | Anionic dispersion liquid 3 | Anionic dispersion liquid 4 | Anionic dispersion liquid 5 | Anionic dispersion liquid 6 | Anionic dispersion liquid 7 | Anionic dispersion liquid 8 | Anionic dispersion liquid 9 |
|---|---|---|---|---|---|---|---|---|---|---|---|
| Pigment | Y | PY74 | | | | | | | 10 | | |
| | M | PR122 | | | | | | | | 10 | |
| | C | PB15:3 | 10 | 10 | 10 | 10 | 10 | 10 | | | |
| | K | | | | | | | | | | 10 |
| | W | | | | | | | | | | |
| Dispersant | Anionic dispersant 1 | Polyurethane + Carboxylic acid + PCD | 15 | | | | | | 15 | 15 | 15 |
| | Anionic dispersant 2 | Polyurethane + Carboxylic acid + PES | | 15 | | | | | | | |
| | Anionic dispersant 3 | Polyurethane Carboxylic acid + PE | | | 15 | | | | | | |
| | Anionic dispersant 4 | Polyurethane + Carboxylic acid + PCD + BI | | | | 15 | | | | | |
| | Anionic dispersant 5 | Stryrene-acryl-based (acrylic acid) | | | | | 15 | | | | |
| | Anionic dispersant 6 | Polycarboxylic acid | | | | | | 15 | | | |

TABLE 1-continued

| Anionic dispersant 7 | Carboxylic acid + PES |
|---|---|

| | | | Anionic dispersion liquid 16 | Anionic dispersion liquid 10 | Anionic dispersion liquid 13 | Anionic dispersion liquid 14 | Anionic dispersion liquid 15 | Anionic dispersion liquid 17 | Anionic dispersion liquid 11 | Anionic dispersion liquid 12 |
|---|---|---|---|---|---|---|---|---|---|---|
| Pigment | Y | PY74 | | | | 10 | | | | |
| | M | PR122 | | | | | 10 | | | |
| | C | PB15:3 | | | 10 | | | | 10 | 10 |
| | K | | | | | | 10 | | | |
| | W | | 10 | | | | | 10 | | |
| Dispersant | Anionic dispersant 1 | Polyurethane + Carboxylic acid + PCD | 15 | | | | | | 5 | 20 |
| | Anionic dispersant 2 | Polyurethane + Carboxylic acid + PES | | | | | | | | |
| | Anionic dispersant 3 | Polyurethane Carboxylic acid + PE | | | | | | | | |
| | Anionic dispersant 4 | Polyurethane + Carboxylic acid + PCD + BI | | | | | | | | |
| | Anionic dispersant 5 | Stryrene-acryl-based (acrylic acid) | | | | | | | | |
| | Anionic dispersant 6 | Polycarboxylic acid | | | | | | | | |
| | Anionic dispersant 7 | Carboxylic acid + PES | | 15 | 15 | 15 | 15 | 15 | | |

TABLE 2

| | | | Cationic dispersion liquid 1 | Cationic dispersion liquid 2 | Cationic dispersion liquid 3 | Cationic dispersion liquid 4 | Cationic dispersion liquid 5 | Cationic dispersion liquid 6 | Cationic dispersion liquid 7 | Cationic dispersion liquid 8 | Cationic dispersion liquid 9 |
|---|---|---|---|---|---|---|---|---|---|---|---|
| Pigment | Y | PY74 | | | | | | | 10 | | |
| | M | PR122 | | | | | | | | 10 | |
| | C | PB15:3 | 10 | 10 | 10 | 10 | 10 | 10 | | | |
| | K | | | | | | | | | | 10 |
| | W | | | | | | | | | | |
| Dispersant | Cationic dispersant 1 | Polyurethane + Quaternary ammonium salt + PCD | 15 | | | | | | 15 | 15 | 15 |
| | Cationic dispersant 2 | Polyurethane + Quaternary ammonium salt + PES | | 15 | | | | | | | |
| | Cationic dispersant 3 | Polyurethane + Quaternary ammonium salt + PE | | | 15 | | | | | | |
| | Cationic dispersant 4 | Polyurethane + Quaternary ammonium salt + PCD + BI | | | | 15 | | | | | |
| | Cationic dispersant 5 | Pyridinium salt + acryl | | | | | 15 | | | | |
| | Cationic dispersant 6 | polyammonium salt | | | | | | 15 | | | |
| | Cationic dispersant 7 | Quaternary ammonium + PES | | | | | | | | | |

TABLE 2-continued

| | | | Cationic dispersion liquid 16 | Cationic dispersion liquid 10 | Cationic dispersion liquid 13 | Cationic dispersion liquid 14 | Cationic dispersion liquid 15 | Cationic dispersion liquid 17 | Cationic dispersion liquid 11 | Cationic dispersion liquid 12 |
|---|---|---|---|---|---|---|---|---|---|---|
| Pigment | Y | PY74 | | | 10 | | | | | |
| | M | PR122 | | | | 10 | | | | |
| | C | PB15:3 | | 10 | | | | | 10 | 10 |
| | K | | | | | | 10 | | | |
| | W | | 10 | | | | | 10 | | |
| Dispersant | Cationic dispersant 1 | Polyurethane + Quaternary ammonium salt + PCD | 15 | | | | | | 5 | 20 |
| | Cationic dispersant 2 | Polyurethane + Quaternary ammonium salt + PES | | | | | | | | |
| | Cationic dispersant 3 | Polyurethane + Quaternary ammonium salt + PE | | | | | | | | |
| | Cationic dispersant 4 | Polyurethane + Quaternary ammonium salt + PCD + BI | | | | | | | | |
| | Cationic dispersant 5 | Pyridinium salt + acryl | | | | | | | | |
| | Cationic dispersant 6 | polyammonium salt | | | | | | | | |
| | Cationic dispersant 7 | Quaternary ammonium + PES | | 15 | 15 | 15 | 15 | 15 | | |

TABLE 3

| | | | Other dispersion liquid 1 | Other dispersion liquid 2 | Other dispersion liquid 3 | Other dispersion liquid 4 | Other dispersion liquid 5 | Other dispersion liquid 6 |
|---|---|---|---|---|---|---|---|---|
| Pigment | Y | PY74 | | | | 10 | | |
| | M | PR122 | | | | | 10 | |
| | C | PB15:3 | 10 | 10 | 10 | | | |
| | K | | | | | | | 10 |
| Dispersant | Other dispersant 1 | Nonionic | 15 | | | 15 | 15 | 15 |
| | Other dispersant 2 | Polyurethane + Carboxylic acid PEG ester | | 15 | | | | |
| | Other dispersant 3 | Styrene acrylic acid PEG ester | | | 15 | | | |

A description will be given below of the detailed preparation method for each dispersion liquid.

3.1.1. Anionic Dispersion Liquid

<Anionic Dispersion Liquid 1>

In a simple pressurizing reaction apparatus provided with a stirrer and a heating apparatus, 57.8 parts of "UH-200" (product name, manufactured by Ube Industries, Ltd.) as polycarbonate diol, 10.5 parts of hexamethylene diisocyanate, 1.7 parts of 2,2-dimethylolpropionic acid, and 30 parts of methyl ethyl ketone were added, stirred at 85° C. for 10 hours to carry out a urethanization reaction and a methyl ethyl ketone solution of polyurethane prepolymer was produced. Next, 17.5 parts of C.I. Pigment Blue 15:3 (manufactured by Dainichiseika Color & Chemicals Mfg. Co., Ltd., product name, also referred to below as "PB15:3") were added as pigment, 282 parts of zirconia beads "YTZ-01" (manufactured by Nikkato Co., Ltd., product name) were added, then the result was crushed for 4 hours in a pigment disperser "Labstar Mini HFM02" (manufactured by Ashizawa Finetech Ltd.) to obtain a pigment slurry.

To 235 parts of the pigment slurry, 1.0 part of triethylamine was added as a neutralizing agent to homogenize the mixture, then 38 parts of ion exchanged water were added while stirring at 200 rpm and the mixture was dispersed. To the obtained dispersion, 5.2 parts of a 10% by weight diethylenetriamine aqueous solution were added as a chain extender, methyl ethyl ketone was distilled off over 8 hours at 65° C. under reduced pressure, the zirconia beads were removed by filtering, and an anionic dispersion liquid 1 coated with a polyurethane resin in which, as solid content, the pigment concentration was 10% by mass and the dispersant concentration was 15% by mass, was obtained.

<Anionic Dispersion Liquid 2>

An anionic dispersion liquid 2 in which, as solid content, the pigment concentration was 10% by mass and the dispersant concentration was 15% by mass, was obtained with the same production method as the anionic dispersion liquid 1 described above except that, in the production of the above anionic dispersion liquid 1, 57.8 parts of polycarbonate diol were changed to 57.8 parts of the polyester diol "San Ester 4620" (product name, manufactured by Sanyo Chemical Industries, Ltd.).

<Anionic Dispersion Liquid 3>

An anionic dispersion liquid 3 in which, as solid content, the pigment concentration was 10% by mass and the dispersant concentration was 15% by mass, was obtained with the same production method as the anionic dispersion liquid 1 described above except that, in the production of the above anionic dispersion liquid 1, 57.8 parts of polycarbonate diol were changed to 57.8 parts of the polyether diol "PTMG2000" (product name, manufactured by Mitsubishi Chemical Corporation, Mn=2,000 poly(oxytetramethylene) glycol).

<Anionic Dispersion Liquid 4>

In the production of the above anionic dispersion liquid 1, after neutralization, 5.2 parts of a 10% by weight diethylenetriamine aqueous solution, which is a chain extender, were added, 1.0 part of a polycarbonate urethane-based resin having blocked isocyanate groups was added, the methyl ethyl ketone was distilled off over 8 hours at 65° C. under reduced pressure, the zirconia beads were removed by filtering, and an anionic dispersion liquid 4 coated with a polyurethane resin in which, as solid content, the pigment concentration was 10% by mass and the dispersant concentration was 15% by mass, was obtained.

<Anionic Dispersion Liquid 5>

20 parts by mass of organic solvent (methyl ethyl ketone), 0.03 parts by mass of a polymerization chain transfer agent (2-mercaptoethanol), a polymerization initiator, 15 parts by mass of polypropylene glycol monomethacrylate (propylene oxide=9), 15 parts by mass of poly(ethylene glycol propylene glycol) monomethacrylate (propylene oxide group=7, ethylene oxide group=5), 12 parts by mass of methacrylic acid, 50 parts by mass of styrene monomer, 10 parts by mass of styrene macromer, and 10 parts by mass of benzyl methacrylate were used and added to a reaction container in which nitrogen gas substitution was sufficiently performed, polymerization was carried out under stirring at 75° C., 0.9 parts by mass of 2,2'-azobis(2,4-dimethylvaleronitrile) dissolved in 40 parts by mass of methyl ethyl ketone were added with respect to 100 parts by mass of the monomer component, and aging was carried out at 80° C. for 1 hour to obtain a polymer solution.

7.5 parts by mass of the water-insoluble polymer obtained as described above were dissolved in 45 parts by mass of methyl ethyl ketone, a predetermined amount of 20% sodium hydroxide aqueous solution (neutralizing agent) was added thereto to neutralize the salt-forming groups, then 20 parts by mass of PB15:3 were added as pigment and kneaded for 2 hours in a bead mill. After adding 120 parts by mass of ion exchanged water to the kneaded mixture obtained in this manner and stirring, methyl ethyl ketone was removed at 6° C. under reduced pressure, and some water was further removed to obtain an anionic dispersion liquid 5 in which, as solid content, the pigment concentration was 10% by mass and the dispersant concentration was 15% by mass.

<Anionic Dispersion Liquid 6>

After carrying out nitrogen substitution of a reaction container provided with a stirrer, a thermometer, a reflux tube, and dropping funnels, 20 parts by mass of cyclohexyl acrylate, 5 parts by mass of 2-ethylhexyl acrylate, 15 parts by mass of butyl acrylate, 10 parts by mass of lauryl acrylate, 2 parts by mass of acrylic acid, and 0.3 parts by mass of t-dodecyl mercaptan were mixed. This mixture solution was heated at 70° C., 150 parts by mass of benzyl acrylate, 15 parts by mass of acrylic acid, 50 parts by mass of butyl acrylate, 1 part by mass of t-dodecyl mercaptan, 20 parts by mass of methyl ethyl ketone, and 1 part by mass of azobisisovaleronitrile, which were prepared separately, were added to the dropping funnels, and the polymerization reaction of the dispersed polymer was carried out while carrying out dropwise addition into the reaction container over 4 hours. Next, methyl ethyl ketone was added to the reaction container to prepare a dispersed polymer solution with a concentration of 40% by mass.

40 parts by mass of the above dispersed polymer solution, 30 parts by mass of Pigment Blue 15:3 (copper phthalocyanine pigment, manufactured by Clariant), 100 parts by mass of 0.1 mol/L sodium hydroxide aqueous solution, and 30 parts by mass of methyl ethyl ketone were mixed and stirred with a homogenizer for 30 minutes. Thereafter, 300 parts by mass of ion exchanged water were added thereto and further stirring was carried out for one hour. Thereafter, all of the methyl ethyl ketone and part of the water were distilled off using a rotary evaporator, neutralization was carried out with 0.1 mol/L sodium hydroxide, the pH was adjusted to 9, then filtering was carried out through a 0.3 μm membrane filter, and adjustment was carried out with ion exchanged water to obtain an anionic dispersion liquid 6 coated with a polycarboxylic acid in which the pigment concentration was 10% by mass and the dispersant concentration was 15% by mass.

<Anionic Dispersion Liquid 7>

An anionic dispersion liquid 7 in which, as solid content, the pigment concentration was 10% by mass and the dispersant concentration was 15% by mass, was obtained with the same production method as the anionic dispersion liquid 1 described above except that, in the production of the above anionic dispersion liquid 1, 17.5 parts of PB15:3 were changed to 17.5 parts of C.I. Pigment Yellow 74 (manufactured by Dainichiseika Color & Chemicals Mfg. Co., Ltd., product name, also referred to below as "PY74").

<Anionic Dispersion Liquid 8>

An anionic dispersion liquid 8 in which, as solid content, the pigment concentration was 10% by mass and the dispersant concentration was 15% by mass, was obtained with the same production method as the anionic dispersion liquid 1 described above except that, in the production of the above anionic dispersion liquid 1, 17.5 parts of PB15:3 were changed to 17.5 parts of C.I. Pigment Red 122 (manufactured by Dainichiseika Color & Chemicals Mfg. Co., Ltd., product name, also referred to below as "PR122").

<Anionic Dispersion Liquid 9>

An anionic dispersion liquid 9 in which, as solid content, the pigment concentration was 10% by mass and the dispersant concentration was 15% by mass, was obtained with the same production method as the anionic dispersion liquid 1 described above except that, in the production of the above anionic dispersion liquid 1, 17.5 parts of PB15:3 were changed to 17.5 parts of commercially available carbon black, S170 (product name, manufactured by Degussa).

<Anionic Dispersion Liquid 10>

To a reaction tank provided with a cooling tube, a stirrer, and a nitrogen introduction tube, 714 parts (2.00 mole parts) of 1,2-propylene glycol, 679 parts (0.87 mole parts) of terephthalic acid, 89 parts (0.13 mole parts) of adipic acid, and 5 parts of titanium diisopropoxy bistriethanolaminate as a polymerization catalyst were added and a reaction was carried out at 180° C. for 12 hours while distilling off the water produced under a stream of nitrogen. Next, while gradually increasing the temperature to 230° C., the reaction was carried out under a stream of nitrogen for 4 hours while removing the produced water, the reaction was further carried out under a reduced pressure of 5 to 20 mmHg, and cooling was carried out when the softening point reached 99° C. The recovered 1,2-propylene glycol was 338 parts (0.95 mole parts). Next, the result was cooled to 180° C., 29 parts (0.03 mole parts) of trimellitic anhydride were added thereto, a reaction was carried out for 1 hour at normal pressure, then, a reaction was carried out for 1 hour at the same temperature while distilling off the water under a reduced pressure of 5 to 20 mmHg. 70 parts of a synthetic material were taken out, 30 parts of methyl ethyl ketone were added thereto, then 17.5 parts of C.I. Pigment Blue 15:3 (manufactured by Dainichiseika Color & Chemicals Mfg. Co., Ltd., product name, also referred to below as "PB15:3") as a pigment were added thereto, 282 parts of zirconia beads "YTZ-01" (Nikkato Corporation, product name) were added thereto, then crushing was carried out for 4 hours in a pigment disperser "Labstar Mini HFM02" (manufactured by Ashizawa Finetech Ltd.) to obtain a pigment slurry.

To 235 parts of pigment slurry, 1.0 part of triethylamine was added as a neutralizing agent and the mixture was homogenized, then 38 parts of ion exchanged water were added thereto while stirring at 200 rpm, and the mixture was dispersed. Methyl ethyl ketone was distilled off over 8 hours at 65° C. under reduced pressure, the zirconia beads were removed by filtering, to obtain an anionic dispersion liquid 10 coated with a polyurethane resin, in which, as solid content, the pigment concentration was 10% by mass and the dispersant concentration was 15% by mass.

<Anionic Dispersion Liquid 11>

An anionic dispersion liquid 11 in which, as solid content, the pigment concentration was 10% by mass and the dispersant concentration was 5% by mass, was obtained with the same production method as the anionic dispersion liquid 1 described above except that, in the production of the above anionic dispersion liquid 1, 57.8 parts of polycarbonate diol, 10.5 parts of hexamethylene diisocyanate, and 1.7 parts of 2,2-dimethylolpropionic acid were changed to 19.3 parts of polycarbonate diol, 3.5 parts of hexamethylene diisocyanate, and 0.57 parts of 2,2-dimethylolpropionic acid, respectively.

<Anionic Dispersion Liquid 12>

An anionic dispersion liquid 12 in which, as solid content, the pigment concentration was 10% by mass and the dispersant concentration was 20% by mass, was obtained with the same production method as the anionic dispersion liquid 1 described above except that, in the production of the above anionic dispersion liquid 1, 57.8 parts of polycarbonate diol, 10.5 parts of hexamethylene diisocyanate, and 1.7 parts of 2,2-dimethylolpropionic acid were changed to 77.1 parts of polycarbonate diol, 14 parts of hexamethylene diisocyanate, and 2.3 parts of 2,2-dimethylolpropionic acid, respectively.

<Anionic Dispersion Liquid 13>

An anionic dispersion liquid 13 in which, as solid content, the pigment concentration was 10% by mass and the dispersant concentration was 15% by mass, was obtained with the same production method as the anionic dispersion liquid 10 described above except that, in the production of the above anionic dispersion liquid 10, 17.5 parts of PB15:3 were changed to 17.5 parts of PY74.

<Anionic Dispersion Liquid 14>

An anionic dispersion liquid 14 in which, as solid content, the pigment concentration was 10% by mass and the dispersant concentration was 15% by mass, was obtained with the same production method as the anionic dispersion liquid 10 described above except that, in the production of the above anionic dispersion liquid 10, 17.5 parts of PB15:3 were changed to 17.5 parts of PR122.

<Anionic Dispersion Liquid 15>

An anionic dispersion liquid 15 in which, as solid content, the pigment concentration was 10% by mass and the dispersant concentration was 15% by mass, was obtained with the same production method as the anionic dispersion liquid 10 described above except that, in the production of the above anionic dispersion liquid 10, 17.5 parts of PB15:3 were changed to 17.5 parts of commercially available carbon black, 5170 (product name, manufactured by Degussa).

<Anionic Dispersion Liquid 16>

An anionic dispersion liquid 16 in which, as solid content, the pigment concentration was 10% by mass and the dispersant concentration was 15% by mass, was obtained with the same production method as the anionic dispersion liquid 1 described above except that, in the production of the above anionic dispersion liquid 1, 17.5 parts of PB15:3 were changed to 17.5 parts of titanium oxide "R62N" (manufactured by Sakai Chemical Industry Co., Ltd.).

<Anionic Dispersion Liquid 17>

An anionic dispersion liquid 17 in which, as solid content, the pigment concentration was 10% by mass and the dispersant concentration was 15% by mass, was obtained with the same production method as the anionic dispersion liquid 10 described above except that, in the production of the above anionic dispersion liquid 10, 17.5 parts of PB15:3 were changed to 17.5 parts of titanium oxide "R62N" (manufactured by Sakai Chemical Industry Co., Ltd.).

3.1.2. Cationic Dispersion Liquid

<Cationic Dispersion Liquid 1>

A cationic dispersion liquid 1 in which, as solid content, the pigment concentration was 10% by mass and the dispersant concentration was 15% by mass, was obtained with the same production method as the anionic dispersion liquid 1 described above except that, in the production of the above anionic dispersion liquid 1, 1.7 parts of 2,2-dimethylolpropionic acid were changed to 1.7 parts of N-methyldiethanolamine as a monomer having a cationic group and 1.0 part of triethylamine was changed to 1.0 part of dimethyl sulfate.

<Cationic Dispersion Liquid 2>

A cationic dispersion liquid 2 in which, as solid content, the pigment concentration was 10% by mass and the dispersant concentration was 15% by mass, was obtained with the same production method as the anionic dispersion liquid 2 described above except that, in the production of the above anionic dispersion liquid 2, 1.7 parts of 2,2-dimethylolpropionic acid were changed to 1.7 parts of N-methyldiethanolamine as a monomer having a cationic group and 1.0 part of triethylamine was changed to 1.0 part of dimethyl sulfate.

<Cationic Dispersion Liquid 3>

A cationic dispersion liquid 3 in which, as solid content, the pigment concentration was 10% by mass and the dispersant concentration was 15% by mass, was obtained with the same production method as the anionic dispersion liquid 3 described above except that, in the production of the above anionic dispersion liquid 3, 1.7 parts of 2,2-dimethylolpropionic acid were changed to 1.7 parts of N-methyldiethanolamine as a monomer having a cationic group and 1.0 part of triethylamine was changed to 1.0 part of dimethyl sulfate.

<Cationic Dispersion Liquid 4>

A cationic dispersion liquid 4 in which, as solid content, the pigment concentration was 10% by mass and the dispersant concentration was 15% by mass, was obtained with the same production method as the anionic dispersion liquid 4 described above except that, in the production of the above anionic dispersion liquid 4, 1.7 parts of 2,2-dimethylolpropionic acid were changed to 1.7 parts of N-methyldiethanolamine as a monomer having a cationic group and 1.0 part of triethylamine was changed to 1.0 part of dimethyl sulfate.

<Cationic Dispersion Liquid 5>

A cationic dispersion liquid 5 in which, as solid content, the pigment concentration was 10% by mass and the dispersant concentration was 15% by mass, was obtained with the same production method as the anionic dispersion liquid 5 described above except that, in the production of the above anionic dispersion liquid 5, 12 parts by mass of methacrylic acid were changed to 12 parts of 4-vinylpyridine as a monomer having a cationic group and 1.0 part of triethylamine was changed to 1.0 part of dimethyl sulfate.

<Cationic Dispersion Liquid 6>

A cationic dispersion liquid 6 in which, as solid content, the pigment concentration was 10% by mass and the dispersant concentration was 15% by mass, was obtained with the same production method as the anionic dispersion liquid 6 described above except that, in the production of the above anionic dispersion liquid 6, 2 parts by mass of the first acrylic acid were changed to 2 parts of 4-vinylpyridine as the monomer having a cationic group, 15 parts by mass of the second acrylic acid were changed to 15 parts of 4-vinylpyridine as the monomer having a cationic group, and 1.0 part of triethylamine was changed to 1.0 part of dimethyl sulfate.

<Cationic Dispersion Liquid 7>

A cationic dispersion liquid 7 in which, as solid content, the pigment concentration was 10% by mass and the dispersant concentration was 15% by mass, was obtained with the same production method as the anionic dispersion liquid 7 described above except that, in the production of the above anionic dispersion liquid 7, 1.7 parts of 2,2-dimethylolpropionic acid were changed to 1.7 parts of N-methyldiethanolamine as the monomer having a cationic group and 1.0 part of triethylamine was changed to 1.0 part of dimethyl sulfate.

<Cationic Dispersion Liquid 8>

A cationic dispersion liquid 8 in which, as solid content, the pigment concentration was 10% by mass and the dispersant concentration was 15% by mass, was obtained with the same production method as the anionic dispersion liquid 8 described above except that, in the production of the above anionic dispersion liquid 8, 1.7 parts of 2,2-dimethylolpropionic acid were changed to 1.7 parts of N-methyldiethanolamine as the monomer having a cationic group and 1.0 part of triethylamine was changed to 1.0 part of dimethyl sulfate.

<Cationic Dispersion Liquid 9>

A cationic dispersion liquid 9 in which, as solid content, the pigment concentration was 10% by mass and the dispersant concentration was 15% by mass, was obtained with the same production method as the anionic dispersion liquid 9 described above except that, in the production of the above anionic dispersion liquid 9, 1.7 parts of 2,2-dimethylolpropionic acid were changed to 1.7 parts of N-methyldiethanolamine as the monomer having a cationic group and 1.0 part of triethylamine was changed to 1.0 part of dimethyl sulfate.

<Cationic Dispersion Liquid 10>

To a reaction tank provided with a cooling tube, a stirrer, and a nitrogen introduction tube, 1120 parts (2.00 mole parts) of N-methyldiethanolamine, 679 parts (0.87 mole parts) of terephthalic acid, 89 parts (0.13 mole parts) of adipic acid, and 5 parts of titanium diisopropoxy bistriethanolaminate as a polymerization catalyst were added and a reaction was carried out at 180° C. for 12 hours while distilling off the water produced under a stream of nitrogen. Next, while gradually increasing the temperature to 230° C., the reaction was carried out under a stream of nitrogen for 4 hours while removing the produced water, the reaction was further carried out under a reduced pressure of 5 to 20 mmHg and cooling was carried out when the softening point reached 99° C. The recovered N-methyldiethanolamine was 532 parts (0.95 mole parts). Then, a reaction was carried out for 1 hour at the same temperature while distilling off the water under a reduced pressure of 5 to 20 mmHg. 70 parts of the synthetic material were taken out, 30 parts of methyl ethyl ketone were added thereto, then 17.5 parts of C.I. Pigment Blue 15:3 (manufactured by Dainichiseika Color & Chemicals Mfg. Co., Ltd., product name, also referred to below as "PB15:3") as a pigment were added thereto, 282 parts of zirconia beads "YTZ-01" (manufactured by Nikkato Corporation, product name) were added thereto, then crushing was carried out for 4 hours in a pigment disperser "Labstar Mini HFM02" (manufactured by Ashizawa Finetech Ltd.) to obtain a pigment slurry.

After adding 1.0 part of dimethyl sulfate as a neutralizing agent to 235 parts of pigment slurry and homogenizing the result, 38 parts of ion exchanged water were added thereto while stirring at 200 rpm to disperse the mixture. Methyl ethyl ketone was distilled off over 8 hours at 65° C. under reduced pressure and the zirconia beads were removed by filtering to obtain a cationic dispersion liquid 10 coated with a polyurethane resin, in which, as solid content, the pigment concentration was 10% by mass and the dispersant concentration was 15% by mass.

<Cationic Dispersion Liquid 11>

A cationic dispersion liquid 11 in which, as solid content, the pigment concentration was 10% by mass and the dispersant concentration was 5% by mass, was obtained with the same production method as the anionic dispersion liquid 11 described above except that, in the production of the above anionic dispersion liquid 11, 0.57 parts of 2,2-dimethylolpropionic acid were changed to 0.57 parts of N-methyldiethanolamine as the monomer having a cationic group and 1.0 part of triethylamine was changed to 1.0 part of dimethyl sulfate.

<Cationic Dispersion Liquid 12>

A cationic dispersion liquid 12 in which, as solid content, the pigment concentration was 10% by mass and the dispersant concentration was 20% by mass, was obtained with the same production method as the anionic dispersion liquid 12 described above except that, in the production of the above anionic dispersion liquid 12, 2.3 parts of 2,2-dimethylolpropionic acid were changed to 2.3 parts of N-methyldiethanolamine as the monomer having a cationic group and 1.0 part of triethylamine was changed to 1.0 part of dimethyl sulfate.

<Cationic Dispersion Liquid 13>

A cationic dispersion liquid 13 in which, as solid content, the pigment concentration was 10% by mass and the dispersant concentration was 15% by mass, was obtained with the same production method as the cationic dispersion liquid 10 described above except that, in the production of the above cationic dispersion liquid 10, 17.5 parts of PB15:3 were changed to 17.5 parts of C.I. Pigment Yellow 74

(manufactured by Dainichiseika Color & Chemicals Mfg. Co., Ltd., product name, also referred to below as "PY74").

<Cationic Dispersion Liquid 14>

A cationic dispersion liquid 14 in which, as solid content, the pigment concentration was 10% by mass and the dispersant concentration was 15% by mass, was obtained with the same production method as the cationic dispersion liquid 10 described above except that, in the production of the above cationic dispersion liquid 10, 17.5 parts of PB15:3 were changed to 17.5 parts of C.I. Pigment Red 122 (manufactured by Dainichiseika Color & Chemicals Mfg. Co., Ltd., product name, also referred to below as "PR122").

<Cationic Dispersion Liquid 15>

A cationic dispersion liquid 15 in which, as solid content, the pigment concentration was 10% by mass and the dispersant concentration was 15% by mass, was obtained with the same production method as the cationic dispersion liquid 10 described above except that, in the production of the above cationic dispersion liquid 10, 17.5 parts of PB15:3 were changed to 17.5 parts of commercially available carbon black, 5170 (product name, manufactured by Degussa).

<Cationic Dispersion Liquid 16>

A cationic dispersion liquid 16 in which, as solid content, the pigment concentration was 10% by mass and the dispersant concentration was 15% by mass, was obtained with the same production method as the anionic dispersion liquid 16 described above except that, in the production of the above anionic dispersion liquid 16, 1.7 parts of 2,2-dimethylolpropionic acid were changed to 1.7 parts of N-methyldiethanolamine as a monomer having a cationic group and 1.0 part of triethylamine was changed to 1.0 part of dimethyl sulfate.

<Cationic Dispersion Liquid 17>

A cationic dispersion liquid 17 in which, as solid content, the pigment concentration was 10% by mass and the dispersant concentration was 15% by mass, was obtained with the same method as the cationic dispersion liquid 10 described above except that, in the production of the above cationic dispersion liquid 10, 17.5 parts of PB15:3 were changed to 17.5 parts of titanium oxide "R62N" (manufactured by Sakai Chemical Industry Co., Ltd.).

3.1.3. Other (Non-Ionic) Dispersion Liquids

<Other Dispersion Liquid 1>

The other dispersion liquid 1 in which, as solid content, the pigment concentration was 10% by mass and the dispersant concentration was 15% by mass, was obtained with the same production method as the anionic dispersion liquid 1 described above except that, urethane prepolymer was changed to Newpol PE108 (manufactured by Sanyo Chemical Industries, Ltd.) as a dispersant.

<Other Dispersion Liquid 2>

The other dispersion liquid 2 in which, as solid content, the pigment concentration was 10% by mass and the dispersant concentration was 15% by mass, was obtained with the same production method as the anionic dispersion liquid 1 described above except that, in the production of the above anionic dispersion liquid 1, 1.7 parts of 2,2-dimethylolpropionic acid was changed to 1.7 parts of 2,2-dimethylolpropionic acid PEG ester. The "2,2-dimethylolpropionic acid PEG ester" refers to an ester compound of 2,2-dimethylolpropionic acid and polyethylene glycol.

<Other Dispersion Liquid 3>

The other dispersion liquid 3 in which, as solid content, the pigment concentration was 10% by mass and the dispersant concentration was 15% by mass, was obtained with the same production method as the anionic dispersion liquid 5 described above except that, in the production of the above anionic dispersion liquid 5, 12 parts by mass of methacrylic acid were changed to 12 parts of polyethylene glycol methacrylate.

<Other Dispersion Liquid 4>

The other dispersion liquid 4 in which, as solid content, the pigment concentration was 10% by mass and the dispersant concentration was 15% by mass, was obtained with the same production method as the other dispersion liquid 1 described above except that, in the production of the above other dispersion liquid 1, 17.5 parts of PB15:3 were changed to 17.5 parts of PY74.

<Other Dispersion Liquid 5>

The other dispersion liquid 5 in which, as solid content, the pigment concentration was 10% by mass and the dispersant concentration was 15% by mass, was obtained with the same production method as the other dispersion liquid 1 described above except that, in the production of the above other dispersion liquid 1, 17.5 parts of PB15:3 were changed to 17.5 parts of PR122.

<Other Dispersion Liquid 6>

The other dispersion liquid 6 in which, as solid content, the pigment concentration was 10% by mass and the dispersant concentration was 15% by mass, was obtained with the same production method as the other dispersion liquid 1 described above except that, in the production of the above other dispersion liquid 1, 17.5 parts of PB15:3 were changed to 17.5 parts of commercially available carbon black, 5170 (product name, manufactured by Degussa).

3.2. Preparation of Ink and Ink Set

Using each of the dispersion liquids obtained above, each component was mixed at the contents shown in Tables 4 to 6 below, stirred for 2 hours at room temperature, and then filtered using a membrane filter with a pore diameter of 5 μm to obtain each ink composition described in Tables 4 to 6 below. In addition, each of the ink compositions described in Table 7 below, prepared with the same methods as described above, were combined as shown in Table 7 below to prepare ink sets. In relation to the ink colors in Tables 4 to 7 below, "Y" represents yellow, "M" represents magenta, "C" represents cyan, "K" represents black, and "W" represents white.

TABLE 4

| | | Example 1 Example | Example 2 Example | Example 3 Example | Example 4 Example | Example 5 Example | Example 6 Example | Example 7 Example | Example 8 Example |
|---|---|---|---|---|---|---|---|---|---|
| Anionic ink | Dispersion liquid | Anionic dispersion liquid 1 | Anionic dispersion liquid 2 | Anionic dispersion liquid 3 | Anionic dispersion liquid 4 | Anionic dispersion liquid 5 | Anionic dispersion liquid 6 | Anionic dispersion liquid 10 | Anionic dispersion liquid 11 |
| | Color | C | C | C | C | C | C | C | C |
| | Concentration | 35 | 35 | 35 | 35 | 35 | 35 | 35 | 35 |
| Wetting agent | Glycerin | 20 | 20 | 20 | 20 | 20 | 20 | 20 | 20 |

TABLE 4-continued

| | | | | | | | | | | |
|---|---|---|---|---|---|---|---|---|---|---|
| | Surfactant | BYK348 | 0.5 | 0.5 | 0.5 | 0.5 | 0.5 | 0.5 | 0.5 | 0.5 |
| | | Pure water | 44.5 | 44.5 | 44.5 | 44.5 | 44.5 | 44.5 | 44.5 | 44.5 |
| Cationic ink | Dispersion liquid | | Cationic dispersion liquid 1 | Cationic dispersion liquid 1 | Cationic dispersion liquid 1 | Cationic dispersion liquid 1 | Cationic dispersion liquid 1 | Cationic dispersion liquid 1 | Cationic dispersion liquid 1 | Cationic dispersion liquid 1 |
| | Color | | C | C | C | C | C | C | C | C |
| | Concentration | | 35 | 35 | 35 | 35 | 35 | 35 | 35 | 35 |
| | Wetting agent | Glycerin | 20 | 20 | 20 | 20 | 20 | 20 | 20 | 20 |
| | Surfactant | BYK348 | 0.5 | 0.5 | 0.5 | 0.5 | 0.5 | 0.5 | 0.5 | 0.5 |
| | | Pure water | 44.5 | 44.5 | 44.5 | 44.5 | 44.5 | 44.5 | 44.5 | 44.5 |
| Liquid evaluation | Physical properties stability | | AA | A | A | B | C | A | A | AA |
| Printing evaluation | Fabric with no pre-treatment | Colorability | AA | AA | AA | AA | A | B | AA | B |
| | | Rubbing resistance | AA | A | B | S | B | A | A | AA |
| | Fabric with pre-treatment | Colorability | AA | AA | AA | AA | A | B | AA | B |
| | | Rubbing resistance | AA | A | B | S | B | A | A | AA |
| | Non-absorbent media | Colorability | AA | AA | AA | AA | A | B | AA | B |
| | | Rubbing resistance | AA | A | B | S | B | A | A | AA |
| | Color difference | | good | good | good | good | good | good | good | good |

| | | | Example 9 | Example 10 | Example 11 | Example 12 | Example 13 | Example 14 | Example 15 |
|---|---|---|---|---|---|---|---|---|---|
| | Examples | | Example | Example | Example | Example | Example | Example | Example |
| Anionic ink | Dispersion liquid | | Anionic dispersion liquid 12 | Anionic dispersion liquid 10 | Anionic dispersion liquid 1 | Anionic dispersion liquid 1 | Anionic dispersion liquid 1 | Anionic dispersion liquid 1 | Anionic dispersion liquid 1 |
| | Color | | C | C | C | C | C | C | C |
| | Concentration | | 35 | 35 | 35 | 35 | 35 | 35 | 35 |
| | Wetting agent | Glycerin | 20 | 20 | 20 | 20 | 20 | 20 | 20 |
| | Surfactant | BYK348 | 0.5 | 0.5 | 0.5 | 0.5 | 0.5 | 0.5 | 0.5 |
| | | Pure water | 44.5 | 44.5 | 44.5 | 44.5 | 44.5 | 44.5 | 44.5 |
| Cationic ink | Dispersion liquid | | Cationic dispersion liquid 1 | Cationic dispersion liquid 10 | Cationic dispersion liquid 2 | Cationic dispersion liquid 3 | Cationic dispersion liquid 4 | Cationic dispersion liquid 5 | Cationic dispersion liquid 6 |
| | Color | | C | C | C | C | C | C | C |
| | Concentration | | 35 | 35 | 35 | 35 | 35 | 35 | 35 |
| | Wetting agent | Glycerin | 20 | 20 | 20 | 20 | 20 | 20 | 20 |
| | Surfactant | BYK348 | 0.5 | 0.5 | 0.5 | 0.5 | 0.5 | 0.5 | 0.5 |
| | | Pure water | 44.5 | 44.5 | 44.5 | 44.5 | 44.5 | 44.5 | 44.5 |
| Liquid evaluation | Physical properties stability | | B | B | A | A | B | C | A |
| Printing evaluation | Fabric with no pre-treatment | Colorability | S | A | AA | AA | AA | A | B |
| | | Rubbing resistance | AA | B | A | A | S | B | A |
| | Fabric with pre-treatment | Colorability | S | A | AA | AA | AA | A | B |
| | | Rubbing resistance | AA | B | A | A | S | B | A |
| | Non-absorbent media | Colorability | S | A | AA | AA | AA | A | B |
| | | Rubbing resistance | AA | B | A | A | S | B | A |
| | Color difference | | good | good | good | good | good | good | good |

TABLE 5

| | | | Example 16 | Example 17 | Example 18 | Example 19 | Example 20 | Example 21 | Example 22 | Example 23 | Example 24 |
|---|---|---|---|---|---|---|---|---|---|---|---|
| | Examples | | Example | Example | Example | Example | Example | Example | Example | Example | Example |
| Anionic ink | Dispersion liquid | | Anionic dispersion liquid 1 | Anionic dispersion liquid 1 | Anionic dispersion liquid 1 | Anionic dispersion liquid 2 | Anionic dispersion liquid 3 | Anionic dispersion liquid 4 | Anionic dispersion liquid 1 | Anionic dispersion liquid 1 | Anionic dispersion liquid 1 |
| | Color | | C | C | C | C | C | C | C | C | C |
| | Concentration | | 35 | 35 | 35 | 35 | 35 | 35 | 17.5 | 70 | 35 |
| | Wetting agent | Glycerin | 20 | 20 | 20 | 20 | 20 | 20 | 20 | 20 | 20 |

TABLE 5-continued

| | | | | | | | | | | | |
|---|---|---|---|---|---|---|---|---|---|---|---|
| | | Surfactant BYK348 | 0.5 | 0.5 | 0.5 | 0.5 | 0.5 | 0.5 | 0.5 | 0.5 | 0.5 |
| | | Pure water | 44.5 | 44.5 | 44.5 | 44.5 | 44.5 | 44.5 | 62 | 9.5 | 44.5 |
| Cationic ink | | Dispersion liquid | Cationic dispersion liquid 10 | Cationic dispersion liquid 11 | Cationic dispersion liquid 12 | Cationic dispersion liquid 2 | Cationic dispersion liquid 3 | Cationic dispersion liquid 4 | Cationic dispersion liquid 1 | Cationic dispersion liquid 1 | Cationic dispersion liquid 1 |
| | | Color | C | C | C | C | C | C | C | C | C |
| | | Concentration | 35 | 35 | 35 | 35 | 35 | 35 | 35 | 35 | 17.5 |
| | Wetting agent | Glycerin | 20 | 20 | 20 | 20 | 20 | 20 | 20 | 20 | 20 |
| | | Surfactant BYK348 | 0.5 | 0.5 | 0.5 | 0.5 | 0.5 | 0.5 | 0.5 | 0.5 | 0.5 |
| | | Pure water | 44.5 | 44.5 | 44.5 | 44.5 | 44.5 | 44.5 | 44.5 | 44.5 | 62 |
| Liquid evaluation | | Physical properties stability | A | AA | B | A | A | B | AA | B | AA |
| Printing evaluation | Fabric with no pre-treatment | Colorability | AA | B | S | AA | AA | AA | B | S | B |
| | | Rubbing resistance | A | AA | AA | B | C | S | AA | AA | AA |
| | Fabric with pre-treatment | Colorability | AA | B | S | AA | AA | AA | B | S | B |
| | | Rubbing resistance | A | AA | AA | B | C | S | AA | AA | AA |
| | Non-absorbent media | Colorability | AA | B | S | AA | AA | AA | B | S | B |
| | | Rubbing resistance | A | AA | AA | B | C | S | AA | AA | AA |
| | | Color difference | good | good | good | good | good | good | good | good | good |

| | | | Example 25 | Example 26 | Example 27 | Example 28 | Example 29 | Example 30 | Example 31 | Example 32 | Example 33 |
|---|---|---|---|---|---|---|---|---|---|---|---|
| | | Examples | Example | Example | Example | Example | Example | Example | Example | Example | Example |
| Anionic ink | | Dispersion liquid | Anionic dispersion liquid 1 | Anionic dispersion liquid 7 | Anionic dispersion liquid 8 | Anionic dispersion liquid 9 | Anionic dispersion liquid 16 | Anionic dispersion liquid 13 | Anionic dispersion liquid 14 | Anionic dispersion liquid 15 | Anionic dispersion liquid 17 |
| | | Color | C | Y | M | K | W | Y | M | K | W |
| | | Concentration | 35 | 35 | 35 | 35 | 35 | 35 | 35 | 35 | 35 |
| | Wetting agent | Glycerin | 20 | 20 | 20 | 20 | 20 | 20 | 20 | 20 | 20 |
| | | Surfactant BYK348 | 0.5 | 0.5 | 0.5 | 0.5 | 0.5 | 0.5 | 0.5 | 0.5 | 0.5 |
| | | Pure water | 44.5 | 44.5 | 44.5 | 44.5 | 44.5 | 44.5 | 44.5 | 44.5 | 44.5 |
| Cationic ink | | Dispersion liquid | Cationic dispersion liquid 1 | Cationic dispersion liquid 7 | Cationic dispersion liquid 8 | Cationic dispersion liquid 9 | Cationic dispersion liquid 16 | Cationic dispersion liquid 13 | Cationic dispersion liquid 14 | Cationic dispersion liquid 15 | Cationic dispersion liquid 17 |
| | | Color | C | Y | M | K | W | Y | M | K | W |
| | | Concentration | 70 | 35 | 35 | 35 | 35 | 35 | 35 | 35 | 35 |
| | Wetting agent | Glycerin | 20 | 20 | 20 | 20 | 20 | 20 | 20 | 20 | 20 |
| | | Surfactant BYK348 | 0.5 | 0.5 | 0.5 | 0.5 | 0.5 | 0.5 | 0.5 | 0.5 | 0.5 |
| | | Pure water | 9.5 | 44.5 | 44.5 | 44.5 | 44.5 | 44.5 | 44.5 | 44.5 | 44.5 |
| Liquid evaluation | | Physical properties stability | B | A | A | A | A | B | B | B | B |
| Printing evaluation | Fabric with no pre-treatment | Colorability | S | AA | AA | AA | AA | A | A | A | A |
| | | Rubbing resistance | AA | AA | AA | AA | AA | B | B | B | B |
| | Fabric with pre-treatment | Colorability | S | AA | AA | AA | AA | A | A | A | A |
| | | Rubbing resistance | AA | AA | AA | AA | AA | B | B | B | B |
| | Non-absorbent media | Colorability | S | AA | AA | AA | AA | A | A | A | A |
| | | Rubbing resistance | AA | AA | AA | AA | AA | B | B | B | B |
| | | Color difference | good | good | good | good | good | good | good | good | good |

TABLE 6

| Examples | | | Example 1 Comparative Example | Example 2 Comparative Example | Example 3 Comparative Example | Example 4 Comparative Example | Example 5 Comparative Example | Example 6 Comparative Example | Example 7 Comparative Example | Example 8 Comparative Example |
|---|---|---|---|---|---|---|---|---|---|---|
| Anionic ink | Dispersion liquid | | Other dispersion liquid 1 | Other dispersion liquid 2 | Other dispersion liquid 3 | Anionic dispersion liquid 1 | Anionic dispersion liquid 1 | Anionic dispersion liquid 1 | Anionic dispersion liquid 1 | Cationic dispersion liquid 1 |
| | | Color | C | C | C | C | C | C | C | C |
| | | Concentration | 35 | 35 | 35 | 35 | 35 | 35 | 35 | 35 |
| | Wetting agent | Glycerin | 20 | 20 | 20 | 20 | 20 | 20 | 20 | 20 |
| | Surfactant | BYK348 | 0.5 | 0.5 | 0.5 | 0.5 | 0.5 | 0.5 | 0.5 | 0.5 |
| | | Pure water | 44.5 | 44.5 | 44.5 | 44.5 | 44.5 | 44.5 | 44.5 | 44.5 |
| Cationic ink | Dispersion liquid | | Cationic dispersion liquid 1 | Cationic dispersion liquid 1 | Cationic dispersion liquid 1 | Other dispersion liquid 1 | Other dispersion liquid 2 | Other dispersion liquid 3 | Anionic dispersion liquid 1 | Cationic dispersion liquid 1 |
| | | Color | C | C | C | C | C | C | C | C |
| | | Concentration | 35 | 35 | 35 | 35 | 35 | 35 | 35 | 35 |
| | Wetting agent | Glycerin | 20 | 20 | 20 | 20 | 20 | 20 | 20 | 20 |
| | Surfactant | BYK348 | 0.5 | 0.5 | 0.5 | 0.5 | 0.5 | 0.5 | 0.5 | 0.5 |
| | | Pure water | 44.5 | 44.5 | 44.5 | 44.5 | 44.5 | 44.5 | 44.5 | 44.5 |
| Liquid evaluation | Physical properties stability | | A | A | A | A | A | A | AA | AA |
| Printing evaluation | Fabric with no pre-treatment | Colorability | B | B | B | D | D | D | D | AA |
| | | Rubbing resistance | B | A | B | D | D | D | D | AA |
| | Fabric with pre-treatment | Colorability | D | D | D | B | B | B | AA | D |
| | | Rubbing resistance | D | D | D | B | A | B | AA | D |
| | Non-absorbent media | Colorability | D | D | D | D | D | D | D | D |
| | | Rubbing resistance | D | D | D | D | D | D | D | D |
| | Color difference | | good | good | good | good | good | good | good | good |

| Examples | | | Example 9 Comparative Example | Example 10 Comparative Example | Example 11 Comparative Example | Example 12 Comparative Example | Example 13 Comparative Example | Example 14 Comparative Example | Example 15 Comparative Example |
|---|---|---|---|---|---|---|---|---|---|
| Anionic ink | Dispersion liquid | | Other dispersion liquid 4 | Other dispersion liquid 5 | Other dispersion liquid 6 | Anionic dispersion liquid 5 | Anionic dispersion liquid 6 | Anionic dispersion liquid 1 | Anionic dispersion liquid 7 |
| | | Color | Y | M | K | C | C | C | Y |
| | | Concentration | 35 | 35 | 35 | 35 | 35 | 35 | 35 |
| | Wetting agent | Glycerin | 20 | 20 | 20 | 20 | 20 | 20 | 20 |
| | Surfactant | BYK348 | 0.5 | 0.5 | 0.5 | 0.5 | 0.5 | 0.5 | 0.5 |
| | | Pure water | 44.5 | 44.5 | 44.5 | 44.5 | 44.5 | 44.5 | 44.5 |
| Cationic ink | Dispersion liquid | | Other dispersion liquid 4 | Other dispersion liquid 5 | Other dispersion liquid 6 | Cationic dispersion liquid 5 | Cationic dispersion liquid 6 | Cationic dispersion liquid 7 | Cationic dispersion liquid 1 |
| | | Color | Y | M | K | C | C | Y | C |
| | | Concentration | 35 | 35 | 35 | 35 | 35 | 35 | 35 |
| | Wetting agent | Glycerin | 20 | 20 | 20 | 20 | 20 | 20 | 20 |
| | Surfactant | BYK348 | 0.5 | 0.5 | 0.5 | 0.5 | 0.5 | 0.5 | 0.5 |
| | | Pure water | 44.5 | 44.5 | 44.5 | 44.5 | 44.5 | 44.5 | 44.5 |
| Liquid evaluation | Physical properties stability | | A | A | A | C | A | AA | AA |
| Printing evaluation | Fabric with no pre-treatment | Colorability | D | D | D | A | B | AA | AA |
| | | Rubbing resistance | D | D | D | D | D | AA | AA |
| | Fabric with pre-treatment | Colorability | D | D | D | A | B | AA | AA |
| | | Rubbing resistance | D | D | D | D | D | AA | AA |
| | Non-absorbent media | Colorability | D | D | D | A | B | AA | AA |
| | | Rubbing resistance | D | D | D | D | D | AA | AA |
| | Color difference | | good | good | good | good | good | poor | poor |

TABLE 7

| Examples | | | Ink Set Example 1 | | | | | Ink Set Example 2 | | | | |
|---|---|---|---|---|---|---|---|---|---|---|---|---|
| Anionic ink | Dispersion liquid | | Anionic dispersion liquid 1 | Anionic dispersion liquid 7 | Anionic dispersion liquid 8 | Anionic dispersion liquid 9 | Anionic dispersion liquid 16 | Anionic dispersion liquid 10 | Anionic dispersion liquid 13 | Anionic dispersion liquid 14 | Anionic dispersion liquid 15 | Anionic dispersion liquid 17 |
| | Color | | C | Y | M | K | W | C | Y | M | K | W |
| | Concentration | | 35 | 35 | 35 | 35 | 35 | 35 | 35 | 35 | 35 | 35 |
| | Wetting agent | Glycerin | 20 | 20 | 20 | 20 | 20 | 20 | 20 | 20 | 20 | 20 |
| | Surfactant | BYK348 | 0.5 | 0.5 | 0.5 | 0.5 | 0.5 | 0.5 | 0.5 | 0.5 | 0.5 | 0.5 |
| | Pure water | | 44.5 | 44.5 | 44.5 | 44.5 | 44.5 | 44.5 | 44.5 | 44.5 | 44.5 | 44.5 |
| Cationic ink | Dispersion liquid | | Cationic dispersion liquid 1 | Cationic dispersion liquid 7 | Cationic dispersion liquid 8 | Cationic dispersion liquid 9 | Cationic dispersion liquid 16 | Cationic dispersion liquid 10 | Cationic dispersion liquid 13 | Cationic dispersion liquid 14 | Cationic dispersion liquid 15 | Cationic dispersion liquid 17 |
| | Color | | C | Y | M | K | W | C | Y | M | K | W |
| | Concentration | | 35 | 35 | 35 | 35 | 35 | 35 | 35 | 35 | 35 | 35 |
| | Wetting agent | Glycerin | 20 | 20 | 20 | 20 | 20 | 20 | 20 | 20 | 20 | 20 |
| | Surfactant | BYK348 | 0.5 | 0.5 | 0.5 | 0.5 | 0.5 | 0.5 | 0.5 | 0.5 | 0.5 | 0.5 |
| | Pure water | | 44.5 | 44.5 | 44.5 | 44.5 | 44.5 | 44.5 | 44.5 | 44.5 | 44.5 | 44.5 |
| Liquid evaluation | Physical properties stability | | AA | | | | | B | | | | |
| Printing evaluation | Fabric with no pre-treatment | Colorability | AA | | | | | A | | | | |
| | | Rubbing resistance | AA | | | | | B | | | | |
| | Fabric with pre-treatment | Colorability | AA | | | | | A | | | | |
| | | Rubbing resistance | AA | | | | | B | | | | |
| | Non-absorbent media | Colorability | AA | | | | | A | | | | |
| | | Rubbing resistance | AA | | | | | B | | | | |

The details of the surfactants in Tables 4 to 7 are as follows.

BYK348 (product name, silicon-based surfactant manufactured by Bic Chemie Japan Co., Ltd.)

In addition, a "fabric with no pre-treatment" refers to a fabric not treated with a cationic compound, a "fabric with pre-treatment" refers to a fabric treated with a water-soluble cationic polymer, which is a cationic compound described below, and a "non-absorbent media" refers to a non-absorbent recording medium as defined in the present specification.

3.3. Recording Method

As the recording media, a white cotton broad cloth was used for the "fabric with no pre-treatment". In addition, for the "fabric with pre-treatment", a white cotton broadcloth was padded with a pre-treatment agent formed of 6.7 parts of water-soluble cationic polymer "Unisense 104L" (product name, manufactured by Senka Corporation) and 93.3 parts of water, using a pad method at a drawing ratio of 70%, dried at 120° C. for 5 minutes, returned to 25° C., and this fabric was used. In addition, for the "non-absorbent media", a plastic film (product name "FOR-BT" manufactured by Futamura Chemical Co., Ltd.) was used. Next, as an ink jet recording apparatus, a printer (product name: "SC-F2000") manufactured by Seiko Epson Corporation was modified (modified device product name "SC-F2000") to be able to print each ink composition or each ink set obtained above in the combinations described in Tables 4 to 7 above.

3.4. Evaluation Method 3.4.1 Evaluation of Stability of Physical Properties

The temperature of each ink composition or each ink set obtained above was adjusted to 25° C. and the static viscosity was measured at a shear rate of 200 (1/s) using a viscoelasticity tester "MCR-300" manufactured by Physica. Thereafter, after sealing in a screw tube bottle and being left to stand at a high temperature of 70° C. for 10 days, then being left to stand until 25° C., the static viscosity was measured in the same manner. Determination of the stability of the physical properties was carried out from the rate of change in viscosity before and after storage, according to the following criteria.

(Evaluation Criteria)

S: (rate of change) 3%.
AA: 3%<(rate of change) 5%
A: 5%<(rate of change) 7.5%
B: 7.5%<(rate of change) 10%
C: 10%<(rate of change) 15%
D 15%<(rate of change)

3.4.2. Evaluation of Colorability

Each ink composition or ink set obtained as described above was filled in the cartridges of the modified ink jet recording apparatus described above such that it was possible to carry out printing with the combinations described in Tables 4 to 7 above. Next, each ink composition was ejected on one surface of each of the above recording media with a coating density of 39 mg/inch$^2$. Thereafter, a heating and drying treatment was carried out at 160° C. for 5 minutes using the conveyor drying oven "Economax D" manufactured by M&R and the temperature was returned to 25° C. to obtain printed materials. The obtained printed materials were evaluated based on the OD (optical density) values measured using a colorimeter "Spectrolino" (Gretag Machbeth) according to the following evaluation criteria.

(Evaluation Criteria)

S: OD value of 1.5 or more
AA: OD value of less than 1.5 and 1.4 or more
A: OD value of less than 1.4 and 1.3 or more
B: OD value of less than 1.3 and 1.2 or more
C: OD value of less than 1.2 and 1.0 or more
D: OD value of less than 1.0

In addition, as an index of color difference, ΔE was evaluated. Specifically, the hue (L*α, a*α, b*α) of the region α to which the anionic ink was attached and the hue (L\*β, a\*β, b\*β) of the region β to which the cationic ink was attached were measured using the colorimeter "Spectrolino" (Gretag Machbeth) and ΔE (Delta E) was calculated and evaluated according to the following criteria. Equation (1) was used to calculate ΔE.

$$\Delta E = ((L^*\alpha - L^*\beta)^2 + (a^*\alpha - a^*\beta)^2 + (b^*\alpha - b^*\beta)^2)^{1/2} \qquad (1)$$

(Evaluation Criteria)

good: ΔE≤1 poor: ΔE>1

3.4.3. Evaluation of Abrasion Resistance

<Fabric with Pre-Treatment and Fabric with No Pre-Treatment>

Each ink composition or ink set obtained above was filled in the cartridges of the modified ink jet recording apparatus described above such that it was possible to carry out printing with the combinations described in Tables 4 to 7 above. Next, each ink composition was ejected on one surface of the fabric with pre-treatment or the fabric with no pre-treatment such that the coating density was 39 mg/inch². Thereafter, a heating and drying treatment was carried out at 160° C. for 5 minutes using the conveyor drying oven "Economax D" manufactured by M&R and the temperature was returned to 25° C. to obtain a printed material.

The obtained textile printed material was dried sufficiently and a rubbing fastness test was performed by rubbing 100 times with a load of 200 g using a color fastness rubbing tester "AB-301S" manufactured by Teser Sangyo Co., Ltd. In accordance with the Japanese Industrial Standards (JIS) JIS L0849 for confirming ink peeling states, the level of dryness was determined in accordance with the following criteria.

(Evaluation Criteria)

S: Grade 4 to 5

AA: Grade 4

A: Grade 3.5 to 4

B: Grade 3.5

C: Grade 2.5 to 3.5

D: Less than grade 2.5

<Non-Absorbent Media>

In the evaluation of rubbing resistance of the fabric with pre-treatment and the fabric with no pre-treatment, the determination was carried out according to the same procedure and evaluation criteria, except that the heating and drying treatment at 160° C. for 5 minutes was changed to a heating and drying treatment at 100° C. for 10 minutes.

3.5. Evaluation Results

The results of the evaluation tests are shown in Tables 4 to 7 above.

From the above evaluation results, in Examples 1 to 33, by mixing an anionic ink including pigments coated with an anionic resin and a cationic ink including pigments coated with a cationic resin, it was possible to aggregate the ink composition regardless of the presence of a pre-treatment on the recording medium and to obtain good colorability. In addition, by at least one of the anionic resin and cationic resin having a urethane-based skeleton or polyester-based skeleton, it was possible to achieve good rubbing fastness (rubbing resistance).

In contrast, in Comparative Examples 1 to 11, in which anionic ink and cationic ink were not mixed, it was not possible to obtain excellent colorability regardless of the presence of a pre-treatment on the recording medium. That is, the aggregation of the ink composition depended on the surface condition of the recording medium and, in a case where the ink composition and the recording medium were not compatible, it was not possible to obtain excellent colorability. In addition, Comparative Examples 12 and 13, in which at least one of the anionic resin and cationic resin did not have a urethane-based skeleton or polyester-based skeleton, had inferior rubbing fastness (rubbing resistance) and Comparative Examples 14 and 15, in which the inks were not similar colors, had inferior colorability with large color differences as a result.

The following is to be derived from the embodiments described above.

An embodiment of an ink jet ink set is an ink jet ink set including an anionic ink containing an anionic resin, a pigment, and water, and a cationic ink containing a cationic resin, pigment, and water, in which the anionic ink and the cationic ink are similar colors to each other, the pigment in the anionic ink is coated with the anionic resin, and the pigment in the cationic ink is coated with the cationic resin, and at least one of the anionic resin and the cationic resin has a urethane-based skeleton or a polyester-based skeleton.

In the embodiment of the ink jet ink set described above, the anionic resin and the cationic resin may have the urethane-based skeleton.

In the embodiment of the ink jet ink set described above, the urethane-based skeleton may contain one or more selected from polycarbonate, polyether, and polyester.

In the embodiment of the ink jet ink set described above, the anionic resin and the cationic resin may have a blocked isocyanate group.

An embodiment of the recording method is a recording method using the ink jet ink set of the embodiment described above, the method including an anionic ink attaching step of ejecting the anionic ink from an ink jet head to be attached to a recording medium, and a cationic ink attaching step of ejecting the cationic ink from the ink jet head to be attached to the recording medium, in which a region on the recording medium to which the anionic ink is attached and a region on the recording medium to which the cationic ink is attached overlap in part or as a whole.

The present disclosure is not limited to the embodiments described above and various modifications are possible. For example, the present disclosure includes configurations substantially identical to the configurations described in the embodiments, for example, configurations identical in function, method, and result, or configurations identical in purpose and effect. In addition, the present disclosure includes configurations in which non-essential portions of the configurations described in the embodiments are replaced. In addition, the present disclosure includes configurations having the same operation and effects as the configurations described in the embodiments or configurations able to achieve the same purpose. In addition, the present disclosure includes configurations in which known techniques are added to the configurations described in the embodiments.

What is claimed is:

1. An ink jet ink set comprising:

an anionic ink containing an anionic resin, a pigment, and water; and a cationic ink containing a cationic resin, a pigment, and water, wherein the anionic ink and the cationic ink are similar colors to each other, the pigment in the anionic ink is coated with the anionic resin, the pigment in the cationic ink is coated with the cationic resin, the anionic resin or the cationic resin, or both have a urethane-based skeleton or a polyester-based skeleton, the cationic resin includes a monomer for imparting a cationic group to the cationic resin, and the monomer includes 4-vinylpyridine, and the anionic resin includes a polyurethane prepolymer having allophanate and biuret groups.

2. The ink jet ink set according to claim 1, wherein the anionic resin and the cationic resin have the urethane-based skeleton.

3. The ink jet ink set according to claim 1, wherein the urethane-based skeleton contains one or more selected from polycarbonate, polyether, and polyester.

4. The ink jet ink set according to claim 1, wherein the anionic resin and the cationic resin have a blocked isocyanate group.

5. A recording method using the ink jet ink set according to claim 1, the method comprising:

ejecting the anionic ink from an ink jet head to be attached to a recording medium; and ejecting the cationic ink from the ink jet head to be attached to the recording medium, wherein a region on the recording medium to which the anionic ink is attached and an area on the recording medium to which the cationic ink is attached overlap in part or as a whole.

* * * * *